United States Patent
Fang

(10) Patent No.: US 8,787,365 B2
(45) Date of Patent: Jul. 22, 2014

(54) METHOD FOR MANAGING A SWITCH CHIP PORT, MAIN CONTROL BOARD, SWITCH BOARD, AND SYSTEM

(71) Applicant: Huawei Technologies Co., Ltd., Guangdong (CN)

(72) Inventor: Qingyin Fang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 37 days.

(21) Appl. No.: 13/675,179

(22) Filed: Nov. 13, 2012

(65) Prior Publication Data

US 2013/0188472 A1    Jul. 25, 2013

Related U.S. Application Data

(63) Continuation of application No. PCT/CN2012/076431, filed on Jun. 4, 2012.

(30) Foreign Application Priority Data

Jan. 21, 2012  (CN) .......................... 2012 1 0019861

(51) Int. Cl.
  *G06F 1/00*    (2006.01)
(52) U.S. Cl.
  USPC ............ 370/388; 710/301; 710/302; 713/330
(58) Field of Classification Search
  CPC ............ H04L 41/0853; H04L 41/0856; H04L 41/0803
  USPC ......... 370/360, 364, 367, 387, 388, 352–356, 370/244, 248, 250; 709/232, 223; 710/301, 710/311, 316, 302; 713/300–340
  See application file for complete search history.

(56) References Cited

U.S. PATENT DOCUMENTS 5,675,735 A * 10/1997 Gallagher et al. ............ 709/228
6,062,480 A *  5/2000 Evoy .............................. 235/492

(Continued)

FOREIGN PATENT DOCUMENTS

CN       1912641 A    2/2007
CN     101494602 A    7/2009

(Continued)

OTHER PUBLICATIONS

International Search Report in corresponding PCT Patent Application No. PCT/CN2012/076431 (Jun. 4, 2012).

(Continued)

*Primary Examiner* — Asad Nawaz
*Assistant Examiner* — Wutchung Chu
(74) *Attorney, Agent, or Firm* — Leydig, Voit & Mayer, Ltd.

(57) ABSTRACT

Embodiments of the present invention provide a method for managing a switch chip port. The method is applied in a distributed communications system and includes: detecting whether each of multiple service boards is in position; when it is detected that a service board is not in position, controlling disabling of a port corresponding to the detected not-in-position service board on a first switch chip of the main control board; and/or sending an in-position message including information about the not-in-position service board to the switch board, so that the switch board controls, according to the information about the not-in-position service board, disabling of a port corresponding to the not-in-position service board on a second switch chip of the switch board. Energy saving of a switch chip port can be efficiently implemented by adopting the technical solutions in the embodiments of the present invention, thereby efficiently reducing power consumption of the system.

20 Claims, 10 Drawing Sheets

(56) References Cited

U.S. PATENT DOCUMENTS

| | | | |
|---|---|---|---|
| 6,681,261 B2* | 1/2004 | Mancusi et al. | 709/250 |
| 6,816,936 B1* | 11/2004 | Wu et al. | 710/302 |
| 6,954,463 B1* | 10/2005 | Ma et al. | 370/401 |
| 7,054,272 B1* | 5/2006 | Noel et al. | 370/241 |
| 7,143,153 B1* | 11/2006 | Black et al. | 709/223 |
| 7,814,356 B2* | 10/2010 | Osano et al. | 713/324 |
| 2002/0097672 A1 | 7/2002 | Barbas et al. | |
| 2002/0174210 A1* | 11/2002 | Halcomb et al. | 709/223 |
| 2003/0023709 A1* | 1/2003 | Alvarez et al. | 709/223 |
| 2003/0200330 A1* | 10/2003 | Oelke et al. | 709/238 |
| 2005/0242197 A1* | 11/2005 | Morrow et al. | 235/492 |
| 2005/0243716 A1* | 11/2005 | Bitar et al. | 370/218 |
| 2006/0112289 A1* | 5/2006 | Chang | 713/300 |
| 2007/0208927 A1* | 9/2007 | Bellens et al. | 713/1 |
| 2008/0124073 A1* | 5/2008 | Moore et al. | 398/2 |
| 2008/0228955 A1* | 9/2008 | Doan et al. | 710/16 |
| 2009/0138692 A1* | 5/2009 | Duda et al. | 713/1 |
| 2010/0023789 A1 | 1/2010 | Lee et al. | |
| 2010/0226385 A1* | 9/2010 | Rochon et al. | 370/419 |
| 2010/0274943 A1* | 10/2010 | Mahadevan et al. | 710/316 |
| 2010/0325455 A1* | 12/2010 | Odaguchi | 713/320 |
| 2011/0231833 A1* | 9/2011 | Narayanan et al. | 717/171 |

FOREIGN PATENT DOCUMENTS

| | | |
|---|---|---|
| CN | 102255653 A | 11/2011 |
| EP | 2393210 A1 | 12/2011 |

OTHER PUBLICATIONS

Bolla et al., "Energy Efficiency in the Future Internet: A Survey of Existing Approaches and Trends in Energy-Aware Fixed Network Infrastructures," 2011, IEEE, New York, New York.

Yamada et al., "Power Efficient Approach and Performance Control for Routers," 2009, IEEE, New York, New York.

* cited by examiner

METHOD FOR MANAGING A SWITCH CHIP PORT, MAIN CONTROL BOARD, SWITCH BOARD, AND SYSTEM

CROSS-REFERENCE TO RELATED APPLICATIONS

This application is a continuation of International Patent Application No. PCT/CN2012/076431, filed on Jun. 4, 2012, which claims priority to Chinese Patent Application No. 201210019861.5, filed on Jan. 21, 2012, both of which are hereby incorporated by reference in their entireties.

FIELD OF THE INVENTION

Embodiments of the present invention relate to the field of communications technologies, and in particular, to a method for managing a switch chip port, a main control board, a switch board, and a system.

BACKGROUND OF THE INVENTION

With the increase of the processing capability of a communications system, it is difficult for centralized management architecture of the communications system to meet the performance requirement, and therefore the centralized management architecture is gradually replaced with distributed management architecture.

In the distributed management architecture of the communications system, each service board has a strong capability for processing services independently. At the same time, the manner for data transmission between service boards adopts a switching architecture rather than the bus sharing mode. That is, service data exchange between service boards is implemented by adding a switch board. The switch board has an independent service data channel with each service board for implementing a point-to-point connection to facilitate data communication. At the same time, to enhance manageability, the distributed management architecture of the communications system retains a centralized main control board. The main control board has management channels with each service board and the switch board, and is responsible for monitoring each service board, configuring and maintaining the switch board, monitoring a status of the switch board, and the like. To ensure that all service boards are capable of performing communication normally after being inserted, both a switch chip port on the main control board and a switch chip port on the switch board are generally enabled and always in the working state.

In the conventional art, the switch chip port on the main control board and a switch chip port on the switch board are always in the working state, resulting in a waste of energy.

SUMMARY OF THE INVENTION

Embodiments of the present invention provide a method for managing a switch chip port, a main control board, a switch board, and a system, for overcoming the defect of a waste of energy in the conventional art.

An embodiment of the present invention provides a method for managing a switch chip port, applied in a distributed communications system. The distributed communications system includes a switch board, a main control board, and multiple service boards, where the main control board includes a first switch chip, adapted to connect to one or more service boards among the multiple service boards through one or more ports of the first switch chip respectively to implement data exchange on a management plane of the communications system; and the switch board includes a second switch chip, adapted to connect to one or more service boards among the multiple service boards through one or more ports of the second switch chip respectively to implement data exchange on a data plane of the communications system. The method includes:

detecting whether each of the multiple service boards is in position; and when it is detected that a service board is not in position, controlling disabling of a port corresponding to the detected not-in-position service board on the first switch chip of the main control board; and/or sending an in-position message including information about the not-in-position service board to the switch board, so that after receiving the in-position message including the information about the not-in-position service board, the switch board controls, according to the information about the not-in-position service board in the received in-position message, disabling of a port corresponding to the not-in-position service board on the second switch chip of the switch board.

An embodiment of the present invention provides a method for managing a switch chip port, applied in a distributed communications system. The distributed communications system includes a switch board, a main control board, and multiple service boards, where the main control board includes a first switch chip, adapted to connect to one or more service boards among the multiple service boards through one or more ports of the first switch chip respectively to implement data exchange on a management plane of the communications system; and the switch board includes a second switch chip, adapted to connect to one or more service boards among the multiple service boards through one or more ports of the second switch chip respectively to implement data exchange on a data plane of the communications system. The method includes:

receiving an in-position message that is sent by the main control board and includes information about an in-position service board or information about a not-in-position service board, where the in-position message is obtained by performing in-position detection on each of the multiple service boards by the main control board; and when the in-position message includes the information about the not-in-position service board, controlling, according to the information about the not-in-position service board, disabling of a port corresponding to the not-in-position service board on the second switch chip of the switch board.

An embodiment of the present invention provides a main control board, located in a distributed communications system. The distributed communications system further includes a switch board and multiple service boards, where the main control board includes a first switch chip, adapted to connect to one or more service boards among the multiple service boards through one or more ports of the first switch chip respectively to implement data exchange on a management plane of the communications system; and the switch board includes a second switch chip, adapted to connect to one or more service boards among the multiple service boards through one or more ports of the second switch chip respectively to implement data exchange on a data plane of the communications system. The main control board further includes:

an in-position detection module, adapted to detect whether each of the multiple service boards is in position;

a processing module, adapted to, when it is detected that a service board is not in position, control disabling of a port corresponding to the detected not-in-position service board on the first switch chip of the main control board; and/or a sending module, adapted to send an in-position message including information about the not-in-position service board to the switch board, so that after receiving the in-position message including the information about the not-in-position service board, the switch board controls, according to the information about the not-in-position service board in the received in-position message, disabling of a port corresponding to the not-in-position service board on the second switch chip of the switch board.

An embodiment of the present invention provides a switch board, located in a distributed communications system. The distributed communications system further includes a main control board and multiple service boards, where the main control board includes a first switch chip, adapted to connect to one or more service boards among the multiple service boards through one or more ports of the first switch chip respectively to implement data exchange on a management plane of the communications system; and the switch board includes a second switch chip, adapted to connect to one or more service boards among the multiple service boards through one or more ports of the second switch chip respectively to implement data exchange on a data plane of the communications system. The switch board further includes:

a receiving module, adapted to receive an in-position message that is sent by the main control board and includes information about an in-position service board or information about a not-in-position service board, where the in-position message is obtained by performing in-position detection on the multiple service boards by the main control board; and a processing module, adapted to, when the in-position message includes the information about the not-in-position service board, control, according to the information about the not-in-position service board, disabling of a port corresponding to the not-in-position service board on the second switch chip of the switch board.

An embodiment of the present invention further provides a distributed communications system, including the preceding main control board, switch board and service boards.

According to the method for managing a switch chip port, the main control board, the switch board, and the system in the embodiments of the present invention, whether a service board is in position is detected, and a related port on the main control board and/or switch board is disabled if the service board is not in position. This is capable of efficiently solving the problem of a waste of energy caused by continuous detection of the link (Link) status of a corresponding link performed by a corresponding port on a switch chip of the main control board and a corresponding port on a switch chip of the switch board when a service board in not in position, thereby better reducing power consumption of the system.

BRIEF DESCRIPTION OF THE DRAWINGS

To illustrate the technical solutions in the embodiments of the present invention or in the prior art more clearly, the following briefly describes the accompanying drawings required for describing the embodiments or the conventional art. Apparently, the accompanying drawings in the following description show some embodiments of the present invention, and persons of ordinary skill in the art can derive other drawings from these accompanying drawings without creative efforts.

DETAILED DESCRIPTION OF THE EMBODIMENTS

To make the objectives, technical solutions, and advantages of the present invention more comprehensible, the following clearly and completely describes the technical solutions according to the embodiments of the present invention with reference to the accompanying drawings in the embodiments of the present invention. Apparently, the embodiments in the following description are merely a part rather than all of the embodiments of the present invention. All other embodiments obtained by persons of ordinary skill in the art based on the embodiments of the present invention without creative efforts shall fall within the protection scope of the present invention.

Figure 1:
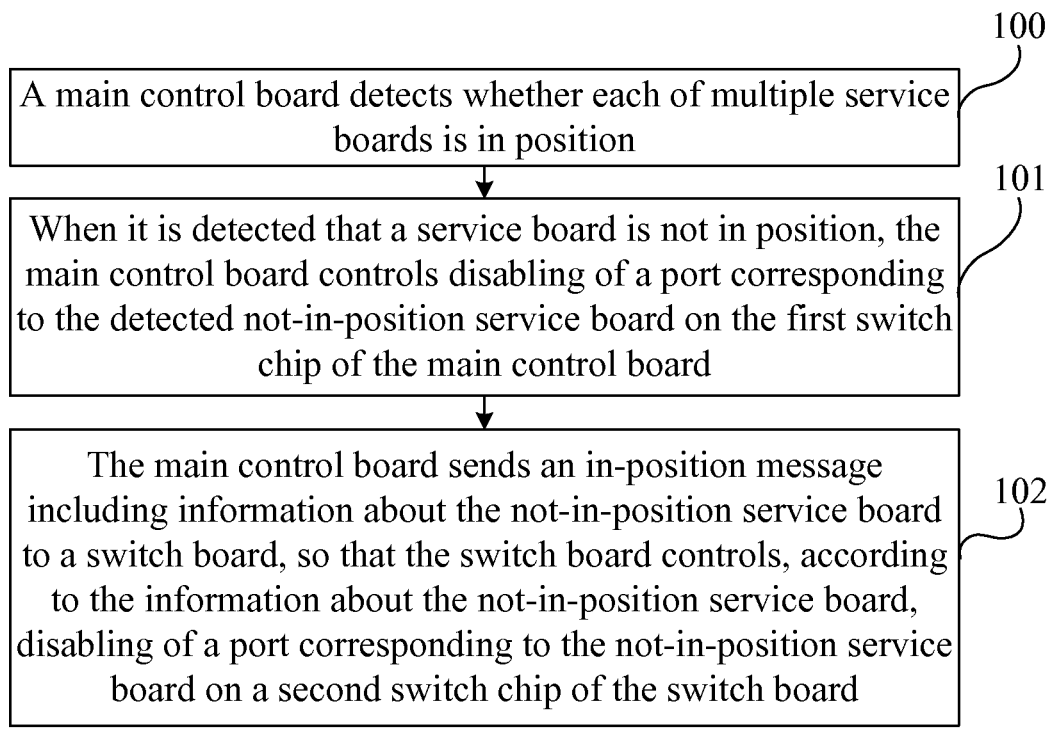
FIG. 1 is a flow chart of a method for managing a switch chip port according to an embodiment of the present invention.

FIG. 1 is a flow chart of a method for managing a switch chip port according to an embodiment of the present invention. The method for managing a switch chip port in this embodiment is applicable in a distributed communications system. The distributed communications system includes a switch board, a main control board, and multiple service boards, where the main control board includes a first switch chip, adapted to connect to one or more service boards among the multiple service boards through one or more ports of the first switch chip respectively to implement data exchange on a management plane (Fabric plane) of the communications system; and the switch board includes a second switch chip, adapted to connect to one or more service boards among the multiple service boards through one or more ports of the second switch chip respectively to implement data exchange on a data plane of the communications system.

In brief, in the distributed communications system, the main control board and the switch board each have a switch chip. The switch chip in the main control board (the first switch chip) is adapted for data exchange on the management plane and the switch chip in the switch board (the second switch chip) is adapted for data exchange on the data plane. Technologies for implementing the architecture and switching are common knowledge for those skilled in the art, and therefore details are not provided herein.

It should be noted that both the main control board and the switch board generally connect to multiple service boards. However, in some extreme cases, the main control board and the switch board may connect to one service board (for example, other connected service boards are all faulty or removed). In the case of one service board, energy can still be saved by using a port disabling method. For ease of description, in this embodiment and each of the following embodiments, it is considered that connecting a switch chip and one service board (an interaction object of the service board is not limited) is a manner for "data exchange". It is not strictly limited that "data exchange" can be completed only in the case of multiple service boards.

The execution subject of the method for managing a switch chip port in this embodiment may be the main control board in the distributed communications system. As shown in FIG. 1, the method for managing a switch chip port in this embodiment may specifically include the following steps:

100. A main control board detects whether each of the multiple service boards is in position.

101. When it is detected that a service board is not in position, the main control board controls disabling of a port corresponding to the detected not-in-position service board on the first switch chip of the main control board.

102. The main control board sends an in-position message including information about the not-in-position service board to the switch board, so that the switch board controls, according to the information about the not-in-position service board, disabling of a port corresponding to the not-in-position service board on the second switch chip of the switch board.

For example, in this embodiment, the information about the not-in-position service board may specifically include a not-in-position state identifier (for example, the not-in-position state identifier may be set to 0, and an in-position state identifier may be set to 1) and the identifier of the not-in-position service board (for example, when service board N is not in position, the identifier of service board N is included). In this manner, the switch board controls, according to the information about the not-in-position service board in the received in-position message, disabling of a port corresponding to the not-in-position service board on the second switch chip of the switch board. The in-position message may be borne and sent based on a conventional communication protocol or various self-defined protocols. These technologies are common knowledge for those skilled in the art, and therefore details are not provided herein.

In this embodiment, port energy saving may be implemented by performing both step 101 and step 102 or either step 101 or step 102. When both step 101 and step 102 are performed and a service board is not in position, energy saving may be implemented by disabling a port corresponding to the not-in-position service board on the first switch chip on the side of the main control board; in addition, energy saving may also be implemented by disabling a port corresponding to the not-in-position service board on the second switch chip on the side of the switch board, thereby achieving a better effect of energy saving.

In this embodiment, a port on the first switch chip of the main control board is adapted to establish management channels with the switch board and the service boards, thereby implementing management on the service board and the switch board. Therefore, the port on the first switch chip of the main control board may be referred to as a switch chip port on the management plane. A port on the second switch chip of the switch board is adapted to establish service data channels with the main control board and the service boards, thereby implementing service data exchange. Therefore, the port on the second switch chip of the switch board may be referred to as a switch chip port on the data plane.

According to the method for managing a switch chip port in this embodiment, by adopting the preceding technical solution, disabling of a corresponding port on the first switch chip of the main control board is controlled, and/or disabling of a corresponding port on the second switch chip of the switch board is controlled when a service board is not in position. This is capable of efficiently preventing the problem of a waste of energy caused by continuous detection of the link (Link) status of a corresponding link performed by the corresponding port on the first switch chip of the main control board and the corresponding port on the second switch chip of the switch board when a service board in not in position. Energy saving of a switch chip port can be efficiently implemented by adopting the technical solution in this embodiment, thereby efficiently reducing power consumption of the system.

Optionally, in the distributed communications system, the switch board may further include another switch chip. For ease of distinction, the preceding switch chip on the main control board is referred to as "the first switch chip", the preceding switch chip on the switch board is referred to as "the second switch chip", and the newly added switch chip is referred to as "a third switch chip". The second switch chip and the third switch chip are adapted to connect to multiple service boards, but the two switch chips support different working modes. For example, the second switch chip supports the working mode of performing communication through a PCIE interface, whereas the third switch chip supports the working mode of performing communication through a Serdes interface. In this manner, the switch board is compatible with service boards in different working modes. Both a service board supporting the PCIE working mode and a service board supporting the Serdes working mode are capable of communicating with the switch board.

When connecting to a port of a switch chip supporting a particular working mode, a service board does not connect to a port of another switch chip. Therefore, a port that is reserved on the other switch ship for connecting to a service board is not occupied. In this case, the unoccupied port may also be disabled for energy saving.

Further, when there are two or more working modes of service boards (the case of multiple working modes is similar to the case of two working modes), switch chips corresponding to the working modes exist on the switch board, and the main control board sends an in-position message including information about a not-in-position service board to the switch board according to the method in step 102, the switch board may control, according to the information about the not-in-position service board, disabling of ports corresponding to the not-in-position service board on all switch chips (that is, the switch chips corresponding to various working modes) of the switch board (for example, if it is detected that a service board inserted in a certain slot supports the PCIE working mode, disabling of a port corresponding to the service board in the slot on the third switch chip (supporting the Serdes working mode) is controlled).

Optionally, based on the method for managing a switch chip port in the preceding embodiment, the method may further include: when it is detected that a service board is in position, performing, by the main control board, a corresponding management operation on a port corresponding to the in-position service board on the first switch chip of the main control board, and performing, by the switch board, a corresponding management operation on a port corresponding to the in-position service board on the second switch chip of the switch board, which may specifically include the following:

(a) when it is detected that a service board is in position, the main control board controls enabling of a port corresponding to the in-position service board on the first switch chip of the main control board; and/or (b) the main control board sends an in-position message including information about the in-position service board to the switch board, so that the switch board controls, according to the information about the in-position service board, enabling of a port corresponding to the in-position service board on the second switch chip of the switch board.

Accordingly, the information about the in-position service board in step (b) may specifically include an in-position state identifier and the identifier of the in-position service board.

Further, optionally, when a certain switch board includes multiple switch chips corresponding to different working modes, that is, when the switch board includes the third switch chip, a port of the third switch chip is adapted to connect to a service board, and the second switch chip and the third switch chip are adapted to support service boards in different working modes respectively. In step (b), disabling of a port corresponding to the in-position service board on a switch chip that does not correspond to the working mode of the in-position service board further needs to be controlled. In this case, the following steps may specifically be included on the side of the main control board:

(i) when it is detected that a service board is in position, the main control board acquires the working mode of the in-position service board;

(ii) the main control board carries the working mode of the in-position service board in an in-position message; and (iii) the main control board sends the in-position message including information about the in-position service board and the working mode of the in-position service board to the switch board, so that the switch board controls, according to the information about the in-position service board and the working mode of the in-position service board in the in-position message, enabling of a port corresponding to the in-position service board on a switch chip that corresponds to the working mode of the in-position service board on the switch board, and controls disabling of a switch chip port corresponding to the in-position service board on a switch chip that does not correspond to the working mode of the in-position service board on the switch board.

Further, optionally, the "controlling, by the main control board, when it is detected that a service board is not in position, disabling of a port corresponding to the detected not-in-position service board on the first switch chip of the main control board" in step 101 in the preceding embodiment may specifically be: when it is detected that a service board is not in position, configuring, by the main control board, a control register that corresponds to the port corresponding to the detected not-in-position service board on the first switch chip of the main control board, to disable the port.

The "controlling, by the main control board, when it is detected that a service board is in position, enabling of a port corresponding to the in-position service board on the first switch chip of the main control board" in (a) in the preceding embodiment specifically includes: when it is detected that a service board is in position, configuring, by the main control board, a control register that corresponds to the port corresponding to the in-position service board on the first switch chip of the main control board, to enable the port.

For details about the process of enabling or disabling a switch chip port by configuring a control register that corresponds to the switch chip port in the preceding embodiment, reference may be made to the related configuration process in the prior art, and therefore the details are not provided herein. Management (for example, disabling or enabling) performed by the switch board or the main control board on a related chip may be implemented by some processing chips on the board. These technologies are common knowledge for those skilled in the art, and therefore details are not provided herein.

By adopting the preceding technical solution, disabling of a corresponding port on the first switch chip of the main control board is controlled, and/or disabling of a corresponding port on the second switch chip of the switch board is controlled when it is detected that a service board is not in position; and enabling of a corresponding port on the first switch chip of the main control board is controlled, and enabling of a corresponding port on the second switch chip of the switch board is also controlled when it is detected that a service board is in position. By adopting the technical solution in this embodiment, efficient management can be performed on a corresponding port on the first switch chip of the main control board and a corresponding port on the second switch chip of the switch board according to in-position information or not-in-position information of a service board. In this manner, when the service board is used, all corresponding ports can be enabled to ensure normal communication, and when the service board is not used, the corresponding ports can be disabled to implement port energy saving, thereby reducing power consumption of the system.

Figure 2:
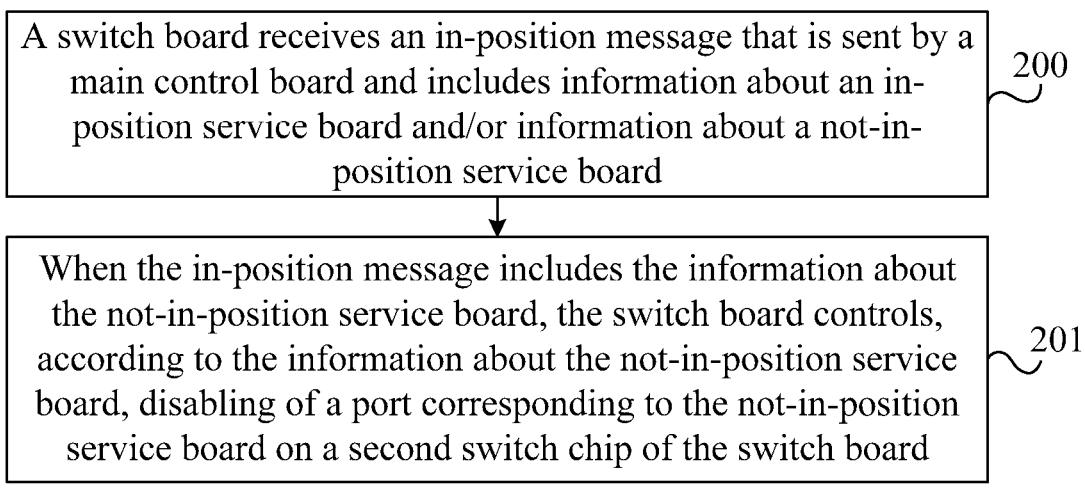
FIG. 2 is a flow chart of a method for managing a switch chip port according to another embodiment of the present invention.

FIG. 2 is a flow chart of a method for managing a switch chip port according to another embodiment of the present invention. The method for managing a switch chip port in this embodiment is applicable in a distributed communications system. The distributed communications system includes a switch board, a main control board, and multiple service boards. The multiple service boards connect to a first switch chip of the main control board through a port of the first switch chip on the main control board respectively to implement data exchange on a management plane of the communications system; and the multiple service boards further connect to a second switch chip of the switch board through a port of the second switch chip on the switch board respectively to implement data exchange on a data plane of the communications system. The execution subject of the method for managing a switch chip port in this embodiment may be the switch board in the distributed communications system. As shown in FIG. 2, the method for managing a switch chip port in this embodiment may specifically include the following steps:

200. The switch board receives an in-position message that is sent by the main control board and includes information about an in-position service board and/or information about a not-in-position service board.

The in-position message is obtained by performing detection on each of the multiple service boards by the main control board. In this embodiment, the information about the in-position service board includes an in-position state identifier and the identifier of the in-position service board. The information about the not-in-position service board includes a not-in-position state identifier and the identifier of the not-in-position service board. For example, the not-in-position state identifier may be set to 0, and the in-position state identifier may be set to 1.

201. When the in-position message includes the information about the not-in-position service board, the switch board controls, according to the information about the not-in-position service board, disabling of a port corresponding to the not-in-position service board on the second switch chip of the switch board.

The technical solution of the method for managing a switch chip port in this embodiment is described on the side of the switch board for the technical solution of the present invention. In this case, only the side of the switch board is considered. The switch board controls, according to the information about the not-in-position service board, disabling of a port corresponding to the not-in-position service board on the second switch chip of the switch board.

According to the method for managing a switch chip port in this embodiment, by adopting the preceding technical solution, disabling of a corresponding port on the second switch chip of the switch board is controlled when it is detected that a service board is not in position. This is capable of efficiently preventing the problem of a waste of energy caused by continuous detection of the link (Link) status of a corresponding link performed by a corresponding port on the second switch chip of the switch board when a service board in not in position. Energy saving of a switch chip port can be efficiently implemented by adopting the technical solution in this embodiment, thereby efficiently reducing power consumption of the system.

Optionally, based on the method for managing a switch chip port in the preceding embodiment, when the in-position message includes the information about the in-position service board, the method may further include: controlling, by the switch board, according to the information about the in-position service board, enabling of a port corresponding to the in-position service board on the second switch chip of the switch board.

Optionally, based on the method for managing a switch chip port in the preceding embodiment, when the service boards correspond to multiple working modes, and switch chips corresponding to the working modes exist in the switch board, for example, the switch board may further include a third switch chip, where a port of the third switch chip is adapted to connect to a service board, and the second switch chip and the third switch chip are adapted to support service boards in different working modes respectively, the controlling, by the switch board, when the in-position message includes the information about the not-in-position service board, according to the information about the not-in-position service board, disabling of a port corresponding to the not-in-position service board on a switch chip of the switch board in step 201 may specifically be: controlling, by the switch board, according to the information about the not-in-position service board, disabling of ports corresponding to the not-in-position service board on all switch chips (that is, the switch chips corresponding to various working modes) of the switch board.

Further, optionally, when the in-position message includes the information about the in-position service board and the in-position message further includes the working mode of the in-position service board, the method further includes the following: the switch board controls, according to the information about the in-position service board and the working mode of the in-position service board, enabling of a port corresponding to the in-position service board on a switch chip that corresponds to the working mode of the in-position service board on the switch board, and controls disabling of a port corresponding to the in-position service board on a switch chip that does not correspond to the working mode of the in-position service board on the switch board. For example, it may be specifically implemented by using the following steps:

(1) the switch board may first acquire, according to the working mode of the in-position service board, a switch chip that corresponds to the working mode of the in-position service board and a switch chip that does not correspond to the working mode of the in-position service board on the switch board;

(2) the switch board controls, according to the information about the in-position service board, enabling of a port corresponding to the in-position service board on the switch chip that corresponds to the working mode of the in-position service board on the switch board; and (3) the switch board further controls disabling of a port corresponding to the in-position service board on the switch chip that does not correspond to the working mode of the in-position service board on the switch board.

Step (2) and step (3) may be performed in any sequence.

In the preceding technical solution, only related operations performed on the side of the switch board are considered. On the side of the main control board, enabling of a port corresponding to the in-position service board on the switch chip of the main control board and/or disabling of a port corresponding to the not-in-position service board on the switch chip of the main control board may be not controlled. Also, at the same time, a port corresponding to the in-position service board may be enabled and/or a port corresponding to the not-in-position service board may be disabled. By adopting this technical solution, when a service board is not in position, a port corresponding to this service board on a switch chip that corresponds to the not-in-position service board may be disabled on the side of the switch board; in addition, a port corresponding to this service board on the corresponding first switch chip may also be disabled on the side of the main control board, thereby saving energy more efficiently.

Optionally, in the method for managing a switch chip port in the preceding embodiment, the "controlling, by the switch board, when the in-position message includes the information about the not-in-position service board, according to the information about the not-in-position service board, disabling of a port corresponding to the not-in-position service board on the second switch chip of the switch board" in step 201 specifically includes: when the in-position message includes the information about the not-in-position service board, configuring, by the switch board, according to the information about the not-in-position service board, a control register that corresponds to the port corresponding to the not-in-position service board on the second switch chip of the switch board, to disable the port.

In the preceding embodiment, the "controlling, by the switch board, when the in-position message includes the information about the in-position service board, according to the information about the in-position service board, enabling of a port corresponding to the in-position service board on the second switch chip of the switch board" specifically includes: when the in-position message includes the information about the in-position service board, configuring, by the switch board, according to the information about the in-position service board, a control register that corresponds to the port corresponding to the in-position service board on the switch chip of the switch board, to enable the port.

Likewise, optionally, in the method for managing a switch chip port in the preceding embodiment, the "controlling, by the switch board, enabling of a port corresponding to the in-position service board on the switch chip that corresponds to the working mode of the in-position service board on the switch board" may specifically include: configuring, by the switch board, a control register that corresponds to the port corresponding to the in-position service board on the switch chip that corresponds to the working mode of the in-position service board on the switch board, to enable the port. The "controlling, by the switch board, disabling of a port corresponding to the in-position service board on the switch chip that does not correspond to the working mode of the in-position service board on the switch board" may specifically include: configuring, by the switch board, a control register that corresponds to the port corresponding to the in-position service board on the switch chip that does not correspond to the working mode of the in-position service board on the switch board, to disable the port.

For details about the process of enabling or disabling a switch chip port by configuring the switch chip port in the preceding embodiment, reference may be made to the related configuration process in the prior art, and therefore details are not provided herein.

By adopting the preceding technical solution, disabling of a corresponding port on the first switch chip of the main control board is controlled, and/or disabling of a corresponding port on the second switch chip of the switch board is controlled when a service board is not in position; and enabling of a corresponding port on the first switch chip of the main control board is controlled, and enabling of a corresponding port on the second switch chip of the switch board is also controlled when a service board is in position. By adopting the technical solution in this embodiment, efficient management can be performed on a corresponding port on the first switch chip of the main control board and a corresponding port on the second switch chip of the switch board according to the in-position status of a service board. In this manner, when the service board is used, all corresponding ports can be enabled to ensure normal communication, and when the service board is not used, the corresponding ports can be disabled to implement port energy saving.

Figure 3A:
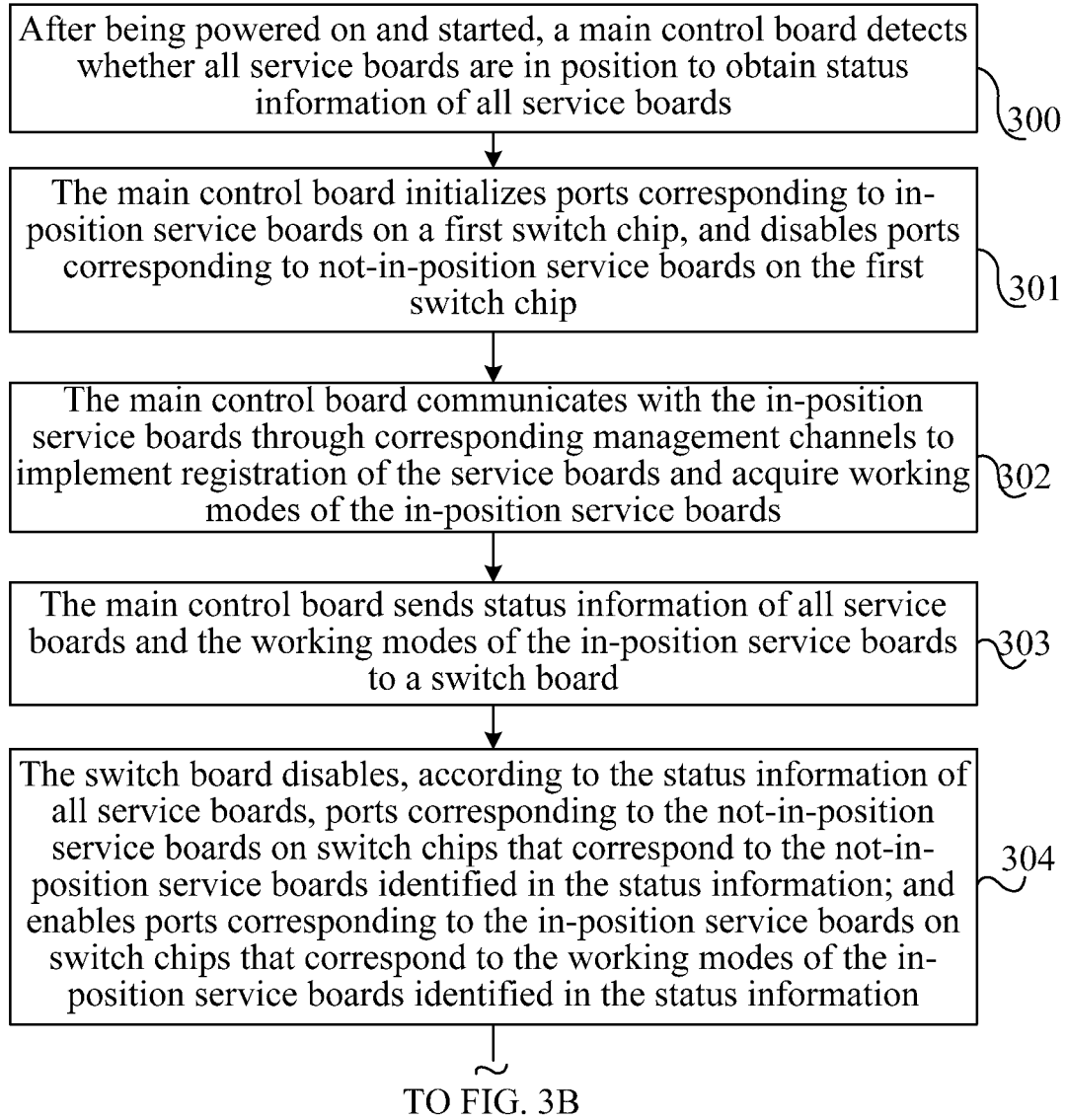
FIGS. 3a and 3b are flow charts summarizing a method for managing a switch chip port according to still another embodiment of the present invention.
Figure 3B:
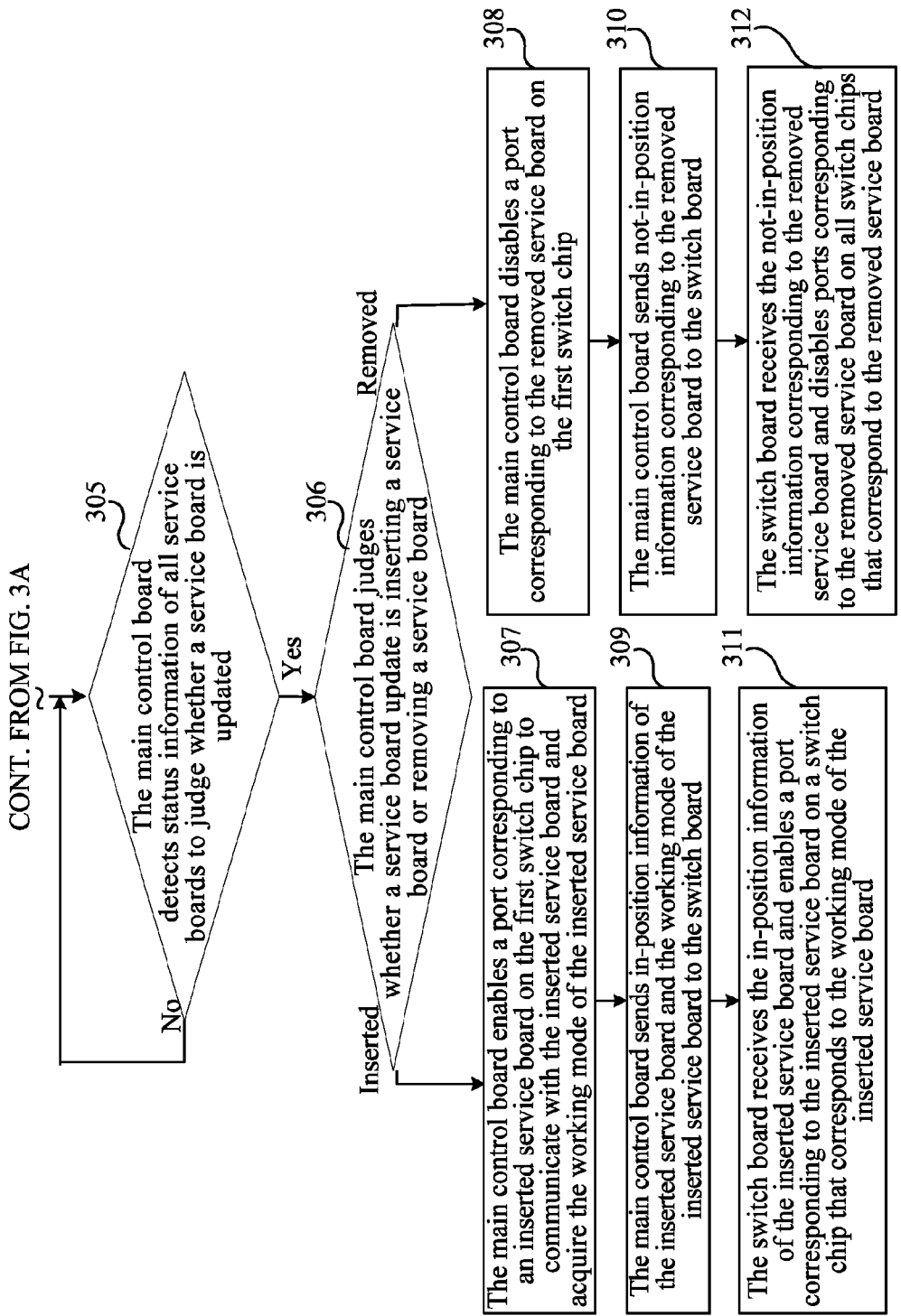

FIG. 3 is a flow chart of a method for managing a switch chip port according to still another embodiment of the present invention. The method for managing a switch chip port in this embodiment may specifically include the following steps:

300. After being powered on and started, a main control board detects whether all service boards are in position to obtain status information of all service boards.

The status information in this embodiment includes in-position information (information about an in-position service board) or not-in-position information (information about a not-in-position service board), where the in-position information includes an in-position identifier and the identifier of the in-position service board, and the not-in-position information includes a not-in-position identifier and the identifier of the not-in-position service board. When a certain service board is in position, the in-position information further includes the working mode of the in-position service board. A distributed communications system may include more than one main control board. In this embodiment, the main control board refers to the active main control board that is being used. The detecting in-position information of each service board by the main control board may be implemented in a manner of high and low levels. Specifically, the main control board may acquire in-position information of each service board by detecting an in-position indication signal status of each service board. For example, if the in-position indication signal status of a service board is a low level, it indicates that the service board is in position; and if the in-position indication signal status of a service board is a high level, it indicates that the service board is not in position.

301. The main control board initializes ports corresponding to in-position service boards on a first switch chip, and disables ports corresponding to not-in-position service boards on the first switch chip.

The main control board initiates the ports corresponding to the in-position service boards on the first switch chip to establish management channels between the in-position service boards and ports of the first switch chip on the main control board.

302. The main control board communicates with the in-position service boards through corresponding management channels to implement registration of the service boards and acquire working modes of the in-position service boards.

303. The main control board sends status information of all service boards and the working modes of the in-position service boards to the switch board.

The sending may be performed by using a message, where the message is referred to as an "in-position message". The in-position message may be borne over a conventional protocol or a self-defined protocol. For ease of description, when sending of status information and/or working modes is mentioned in the following, it is not specified that the sending is performed by using a certain message. Those skilled in the art may clearly know, according to the description in this specification and common knowledge, that the information or modes are definitely sent based on a specific carrier (message).

304. The switch board disables, according to the status information of all service boards, ports corresponding to the not-in-position service boards on switch chips that correspond to the not-in-position service boards identified in the status information; and enables ports corresponding to the in-position service boards on switch chips that correspond to the working modes of the in-position service boards identified in the status information.

The disabling the ports corresponding to the not-in-position service boards on switch chips that correspond to the not-in-position service boards identified in the status information specifically refers to disabling ports corresponding to the not-in-position service boards on all switch chips that correspond to the not-in-position service boards on the switch board identified in the status information.

305. The main control board detects the status information of all service boards and judges whether a service board is updated. If a service board is updated, perform step 306; and otherwise, return to 305 to continue the detection.

A service board update in this embodiment refers to inserting a service board or removing a service board.

306. The main control board judges whether the service board update is inserting a service board or removing a service board. When the service board update is inserting a service board, perform step 307; and when the service board update is removing a service board, perform step 308.

307. The main control board enables a port corresponding to the inserted service board on the first switch chip to communicate with the inserted service board and acquire the working mode of the inserted service board. Then, step 309 is performed.

308. The main control board disables a port corresponding to the removed service board on the first switch chip. Then, step 310 is performed.

309. The main control board sends in-position information of the inserted service board and the working mode of the inserted service board to the switch board. Then, step 311 is performed.

Specifically, the main control board may send the in-position information of the inserted service board and the working mode of the inserted service board to the switch board through a management channel between the main control board and the switch board.

310. The main control board sends not-in-position information corresponding to the removed service board to the switch board. Then, step 312 is performed.

In this embodiment, the not-in-position information of the removed service board includes a not-in-position state identifier and the identifier of the removed service board.

311. The switch board receives the in-position information of the inserted service board and enables a port corresponding to the inserted service board on a switch chip that corresponds to the working mode of the inserted service board.

312. The switch board receives the not-in-position information corresponding to the removed service board and disables ports corresponding to the removed service board on all switch chips that correspond to the removed service board.

According to the method for managing a switch chip port in this embodiment, when a service board is not in position, disabling of a corresponding port on the first switch chip of the main control board is controlled, and disabling of ports corresponding to a not-in-position service board on all switch chips of the switch board is controlled, thereby efficiently implementing port energy saving. In addition, when a service board is in position, enabling of a corresponding port on the first switch chip of the main control board is controlled, and enabling of a corresponding port on a switch chip that corresponds to the working mode of the in-position service board on the switch board is also controlled, thereby ensuring normal working of the service board. By adopting the technical solution in this embodiment, efficient management can be performed on a corresponding port on the first switch chip of the main control board and corresponding ports on the switch chips of the switch board according to in-position information. In this manner, when a service board is used, all corresponding ports can be enabled to ensure normal communication, and when the service board is not used, the corresponding ports can be disabled to implement port energy saving.

In the preceding embodiments, the port on the first switch chip of the main control board includes, but is not limited to, a fast Ethernet (Fast Ethernet; FE for short) port, a gigabit Ethernet (Gigabit Ethernet; GE for short) port, a peripheral component interconnect express (Peripheral Component Interconnect Express; PCIE for short) port, and the like; ports on the second switch chip and the third switch chip of the switch board include, but are not limited to, an FE port, a GE port, a PCIE port, a serialiazer and deserializer (Serialiazer and Deserializer; SerDes for short) port, and the like.

Persons of ordinary skill in the art should understand that all or part of the steps of the method specified in any embodiment of the present invention may be implemented by a program instructing relevant hardware. The program may be stored in a computer readable storage medium. When the program runs, the program executes the steps of the method specified in any embodiment above. The storage medium may be any medium capable of storing program codes, such as a ROM, a RAM, a magnetic disk or an optical disk.

Figure 4:
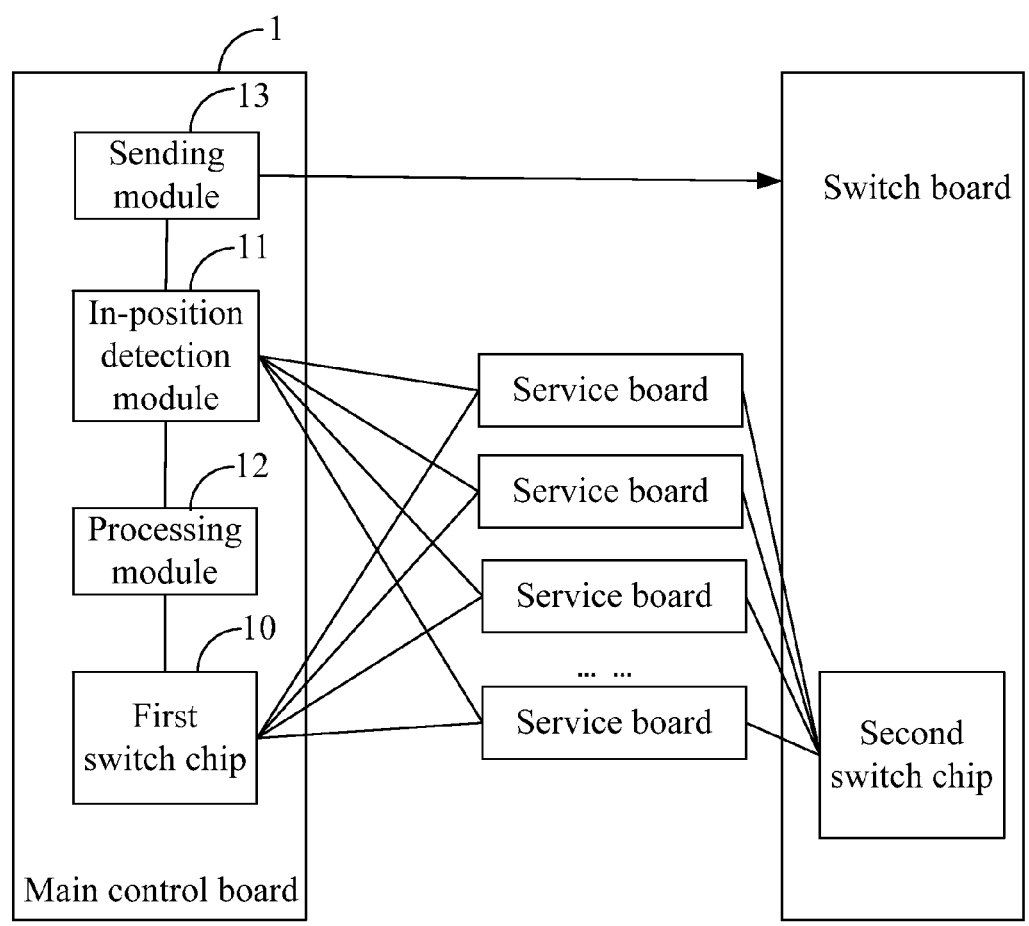
FIG. 4 is a schematic structural diagram of a main control board according to an embodiment of the present invention.

FIG. 4 is a schematic structural diagram of a main control board according to an embodiment of the present invention. As shown in FIG. 4, the main control board 1 in this embodiment is located in a distributed communications system. The distributed communications system further includes a switch board and multiple service boards in addition to the main control board 1. The multiple service boards connect to a first switch chip 10 on the main control board 1 through ports of the first switch chip 10 on the main control board 1 respectively to implement data exchange on a management plane of the communications system; the multiple service boards further connect to a second switch chip on the switch board through ports of the second switch chip on the switch board respectively to implement data exchange on a data plane of the communications system. The main control board 1 in this embodiment further includes: an in-position detection module 11, a processing module 12 and/or a sending module 13. As shown in FIG. 4, the main control board 1 including the sending module 13 is taken as an example in this embodiment. In a practical application, the main control board in this embodiment may also not include the sending module 13.

The in-position detection module 11 is adapted to detect whether each of the multiple service boards is in position. The processing module 12 connects to the in-position detection module 11. The processing module 12 is adapted to, when the in-position detection module 11 detects that a service board is not in position, control disabling of a port corresponding to the detected not-in-position service board on the first switch chip 10 of the main control board 1. The sending module 13 connects to the in-position detection module 11. The sending module 13 is adapted to, when the in-position detection module 11 detects that a service board is not in position, send an in-position message including information about the not-in-position service board to the switch board, so that the switch board controls, according to the information about the not-in-position service board, disabling of a port corresponding to the not-in-position service board on the second switch chip of the switch board.

The mechanism for the main control board in this embodiment to implement a method for managing a switch chip port using the preceding modules is the same as the implementation of the preceding related method embodiment. For details, reference may be made to the preceding related method embodiment, and therefore the details are not provided herein.

Using the preceding modules, the main control board in this embodiment is capable of controlling, when in-position information of a service board is the not-in-position state, disabling of a corresponding port on a switch chip of the main control board, and/or controlling disabling of a corresponding port on a switch chip of the switch board. This is capable of efficiently preventing the problem of a waste of energy caused by continuous detection of the link (Link) status of a corresponding link performed by the corresponding port on the switch chip of the main control board and the corresponding port on the switch chip of the switch board when a service board in not in position. Port energy saving can be efficiently implemented by adopting the technical solution in this embodiment, thereby efficiently reducing power consumption of the system.

Figure 5:
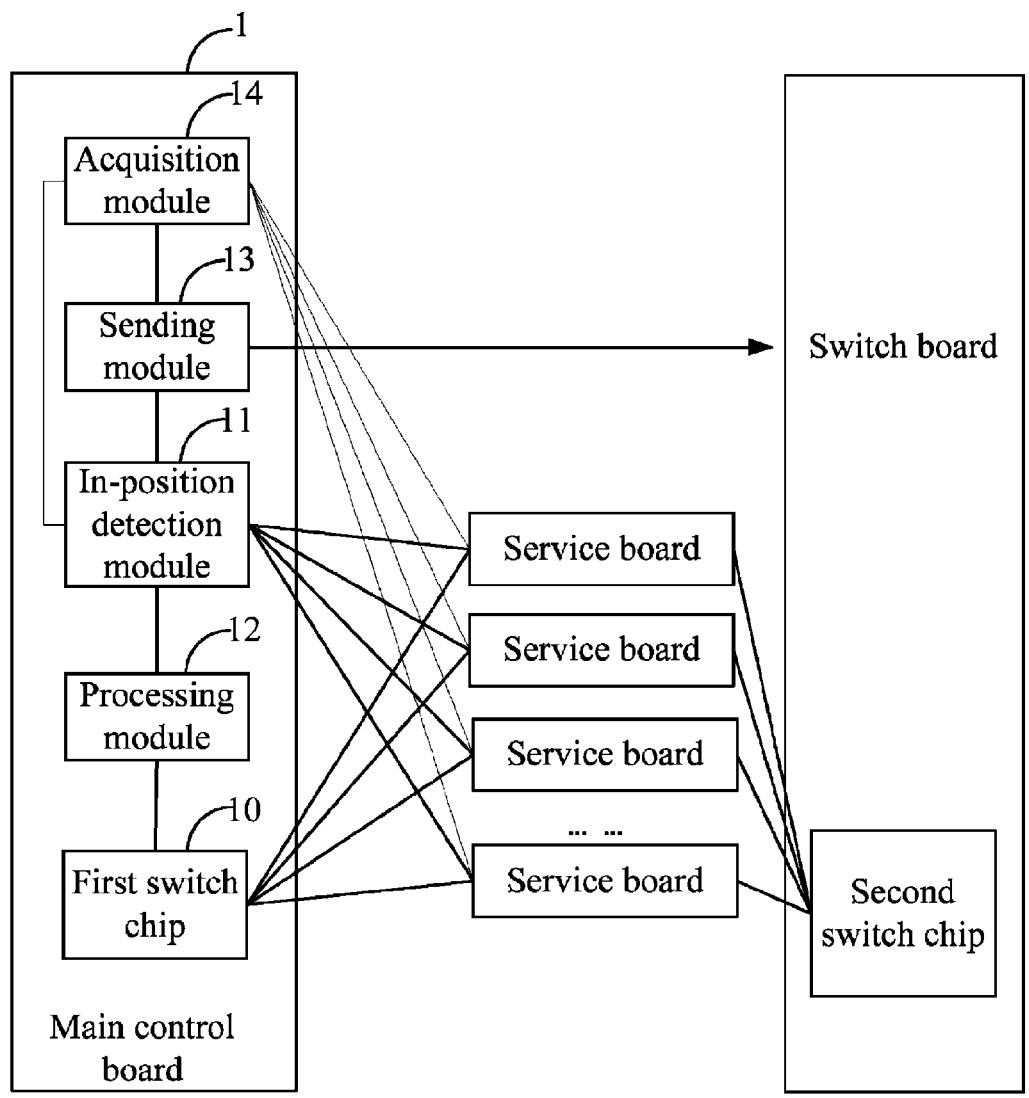
FIG. 5 is a schematic structural diagram of a main control board according to another embodiment of the present invention.

FIG. 5 is a schematic structural diagram of a main control board according to another embodiment of the present invention. As shown in FIG. 5, the main control board 1 provided in this embodiment may further include the following technical solution based on the embodiment shown in FIG. 4:

In this embodiment, the processing module 12 in the main control board 1 is further adapted to, when the in-position detection module 11 detects that a service board is in position, control enabling of a port corresponding to the detected in-position service board on the first switch chip of the main control board 1; and/or the sending module 13 is further adapted to send an in-position message including information about the in-position service board to the switch board, so that the switch board controls, according to the information about the in-position service board, enabling of a port corresponding to the in-position service board on the second switch chip of the switch board.

Further, optionally, the switch board in the distributed system further includes a third switch chip. A port of the third switch chip is adapted to connect to a service board, and the second switch chip and the third switch chip are adapted to support service boards in different working modes respectively. The main control board 1 in this embodiment may further include an acquisition module 14. The acquisition module 14 connects to the in-position detection module 11. The acquisition module 14 is adapted to, when the in-position detection module 11 detects that a service board is in position, acquire the working mode of the in-position service board. In this case, the sending module 13 further connects to the acquisition module 14, and the sending module 13 is further adapted to, when the in-position detection module 11 detects that a service board is in position, send an in-position message including information about the in-position service board and the working mode of the in-position service board to the switch board, so that the switch board controls, according to the information about the in-position service board and the working mode of the in-position service board, enabling of a port corresponding to the in-position service board on a switch chip that corresponds to the working mode of the in-position service board on the switch board, and controls disabling of a port corresponding to the in-position service board on a switch chip that does not correspond to the working mode of the in-position service board on the switch board. Optionally, the main control board provided in this embodiment further includes the following:

Optionally, in this embodiment, the processing module 12 in the main control board is specifically adapted to, when the in-position detection module 11 detects that a service board is not in position, configure a control register that corresponds to a port corresponding to the not-in-position service board on the first switch chip 10 of the main control board 1 to disable the port corresponding to the not-in-position service board; or the processing module 12 is specifically adapted to, when the in-position detection 11 detects that a service board is in position, configure a control register that corresponds to a port corresponding to the in-position service board on the first switch chip 10 of the main control board 1 to enable the port corresponding to the in-position service board.

According to the main control board in this embodiment, the technical solution of the present invention is described on the basis that multiple optional embodiments coexist. In the practical application, the various optional embodiments in this embodiment may form an embodiment of the present invention in the manner of a random combination. Details are not provided herein.

The mechanism for the main control board in this embodiment to implement a method for managing a switch chip port using the preceding modules is the same as the implementation of the preceding related method embodiment. For details, reference may be made to the preceding related method embodiment, and therefore the details are not provided herein.

Using the preceding modules, the main control board in this embodiment is capable of controlling, when a service board is not in position, disabling of a corresponding port on the first switch chip of the main control board, and/or controlling disabling of a corresponding port on a switch chip that corresponds to the not-in-position service board on the switch board; and controlling, when a service board is in position, enabling of a corresponding port on the first switch chip of the main control board, and controlling enabling of a corresponding port on a switch chip that corresponds to the in-position service board on the switch board. By adopting the technical solution in this embodiment, efficient management can be performed on a corresponding port on the first switch chip of the main control board and a corresponding port on a switch chip of the switch board according to in-position information. In this manner, when a service board is used, all corresponding ports can be enabled to ensure normal communication, and when the service board is not used, the corresponding ports can be disabled to implement port energy saving.

Figure 6:
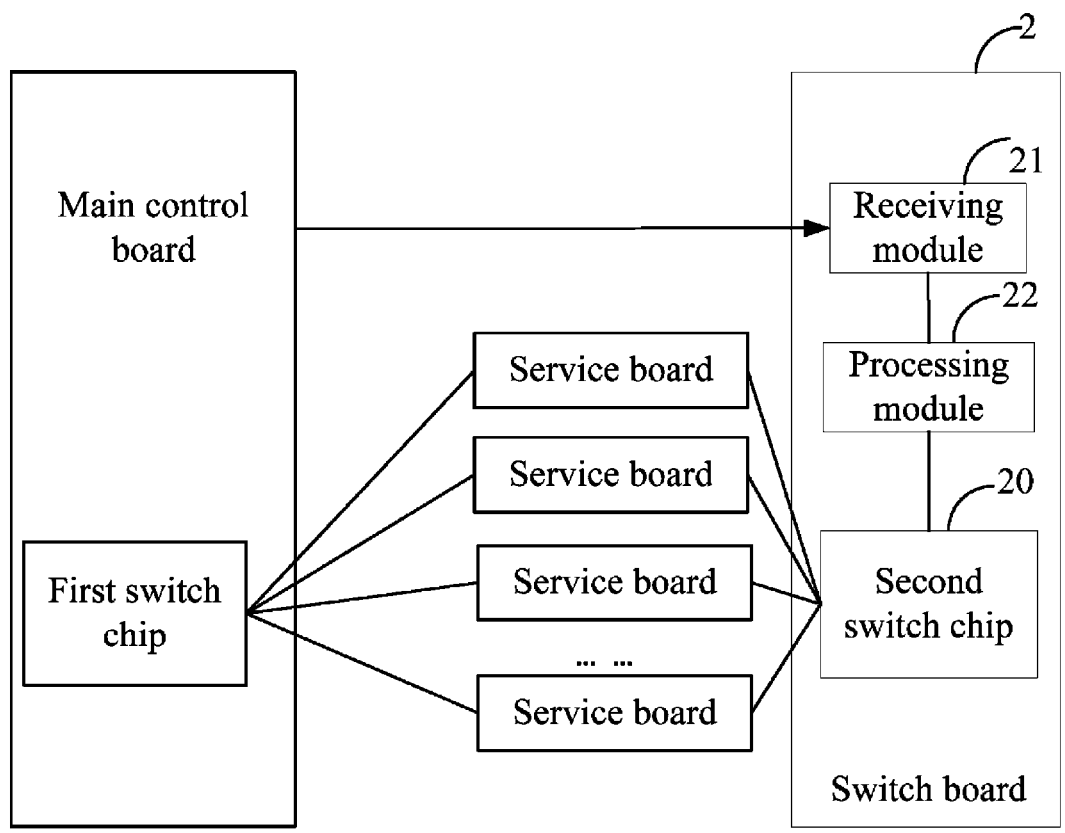
FIG. 6 is a schematic structural diagram of a switch board according to an embodiment of the present invention.

FIG. 6 is a schematic structural diagram of a switch board according to an embodiment of the present invention. As shown in FIG. 6, the switch board 2 in this embodiment is located in a distributed communications system. The distributed communications system further includes a main control board and multiple service boards. The multiple service boards connect to a first switch chip on the main control board through ports of the first switch chip on the main control board respectively to implement data exchange on a management plane of the communications system; the multiple service boards further connect to a second switch chip 20 on the switch board 2 through ports of the second switch chip 20 on the switch board 2 respectively to implement data exchange on a data plane of the communications system. The switch board 2 in this embodiment further includes a receiving module 21 and a processing module 22.

The receiving module 21 is adapted to receive an in-position message that is sent by the main control board and includes information about an in-position service board and/or information about a not-in-position service board, where the in-position message is obtained by performing in-position detection on the multiple service boards by the main control board. The processing module 22 connects to the receiving module 21. The processing module 22 is adapted to, when the in-position message received by the receiving module 21 includes information about a not-in-position service board, control, according to the information about the not-in-position service board, disabling of a port corresponding to the not-in-position service board on the second switch chip 20 of the switch board 2.

The mechanism for the switch board in this embodiment to implement a method for managing a switch chip port using the preceding modules is the same as the implementation of the preceding related method embodiment. For details, reference may be made to the preceding related method embodiment, and therefore the details are not provided herein.

Using the preceding modules, the switch board in this embodiment is capable of controlling, when in-position information of a service board is the not-in-position state, disabling of a corresponding port on the second switch chip of the switch board. This is capable of efficiently preventing the problem of a waste of energy caused by continuous detection of the link (Link) status of a corresponding link performed by a corresponding port on the second switch chip of the switch board when a service board in not in position. Port energy saving can be efficiently implemented by adopting the technical solution in this embodiment, thereby efficiently reducing power consumption of the system.

Figure 7:
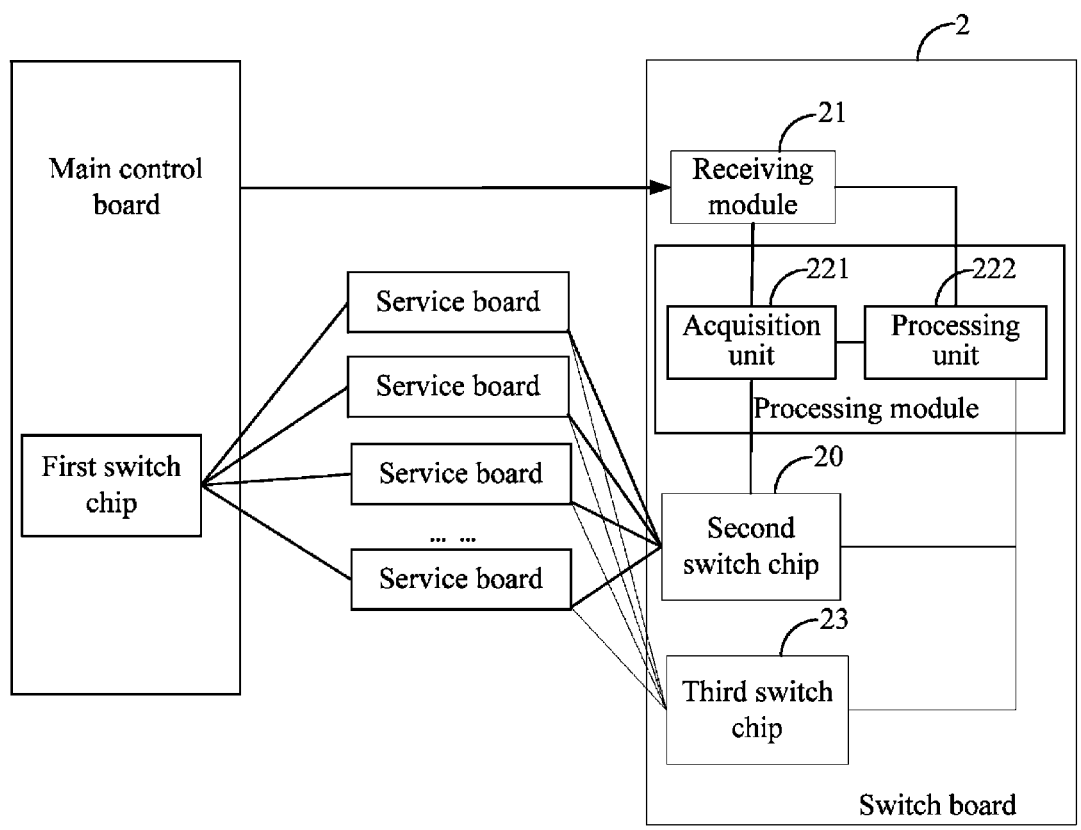
FIG. 7 is a schematic structural diagram of a switch board according to another embodiment of the present invention.

FIG. 7 is a schematic structural diagram of a switch board according to another embodiment of the present invention. As shown in FIG. 7, the switch board in this embodiment further includes the following content based on the embodiment shown in FIG. 6:

The processing module 22 in the switch board in this embodiment is further adapted to, when the in-position message received by the receiving module 21 includes information about an in-position service board, control, according to the information about the in-position service board, a port corresponding to the in-position service board on the second switch chip 20 of the switch board 2.

Optionally, the switch board 2 further includes a third switch chip 23. A port of the third switch chip 23 is adapted to connect to a service board, and the second switch chip 20 and the third switch chip 30 are adapted to support service boards in different working modes respectively. For example, the processing module 22 is further adapted to, when the in-position message received by the receiving module 21 includes the information about the in-position service board and the in-position message further includes the working mode of the in-position service board, control, according to the information about the in-position service board and the working mode of the in-position service board, enabling of a port corresponding to the in-position service board on a switch chip that corresponds to the working mode of the in-position service board on the switch board, and control disabling of a port corresponding to the in-position service board on a switch chip that does not correspond to the working mode of the in-position service board on the switch board.

For example, the processing module 22 in the embodiment shown in FIG. 6 is adapted to, when the in-position message received by the receiving module 21 includes information about a not-in-position service board, configure, according to the information about the not-in-position service board, a control register that corresponds to a port corresponding to the not-in-position service board on the second switch chip 20 of the switch board 2, to disable the port corresponding to the not-in-position service board. Optionally, the processing module 22 is adapted to, when the in-position message received by the receiving module 20 includes information about an in-position service board, configure, according to the information about the in-position service board, a control register that corresponds to a port corresponding to the in-position service board on the second switch chip 20 of the switch board 2, to enable the port corresponding to the in-position service board.

Further, optionally, when the in-position message received by the receiving module 21 includes information about an in-position service board and the in-position message further includes the working mode of the in-position service board, the processing module 22 may include an acquisition unit 221 and a processing unit 222.

The acquisition unit 221 connects to the receiving module 21. The acquisition unit 221 is adapted to acquire, according to the working mode of the in-position service board in the in-position message received by the receiving module 21, a switch chip that corresponds to the working mode of the in-position service board on the switch board 2 and a switch chip that does not correspond to the working mode of the in-position service board on the switch board 2. The processing unit 222 connects to the receiving module 21 and the acquisition unit 221, respectively. The processing unit 222 may further connect to the second switch chip 20 and the third switch chip 23. The processing unit 222 is adapted to control, according to the information about the in-position service board in the in-position message received by the receiving module 21, enabling of a port corresponding to the in-position service board on the switch chip that corresponds to the working mode of the in-position service board on the switch board 2. The processing unit 222 is further adapted to control disabling of a port corresponding to the in-position service board on the switch chip that does not correspond to the working mode of the in-position service board on the switch board 2.

Optionally, when the in-position message received by the receiving module 21 includes information about a not-in-position service board, accordingly, the processing module 22 controls disabling of ports corresponding to the not-in-position service board on switch chips that correspond to all working modes corresponding to the not-in-position service board.

Optionally, the processing unit 222 in the switch board in the preceding embodiment is specifically adapted to configure, according to information about an in-position service board in the in-position message received by the receiving module 21, a port corresponding to the in-position service board on a switch chip that corresponds to the working mode of the in-position service board on the switch board, to enable the port corresponding to the in-position service board on the switch chip that corresponds to the working mode of the in-position service board. The processing unit 222 is further specifically adapted to configure a port corresponding to the in-position service board on a switch chip that does not correspond to the working mode of the in-position service board on the switch board, to disable the port corresponding to the in-position service board on the switch chip that does not correspond to the working mode of the in-position service board.

Optionally, on the basis that the switch board in this embodiment includes the preceding modules and units, the following conditions may further exist: after detecting the service boards to obtain in-position information of the service boards and when a service board is not in position, the main control board further controls, according to the not-in-position information of the service board, disabling of a port corresponding to the not-in-position service board on a switch chip of the main control board; or when a service board is in position, controls, according to the in-position information of the service board, enabling of a port corresponding to the in-position service board on the switch chip of the main control board.

According to the switch board in this embodiment, the technical solution of the present invention is described on the basis that multiple optional embodiments coexist. In a practical application, the various optional embodiments in this embodiment may form an embodiment of the present invention in the manner of a random combination. Details are not provided herein.

The mechanism for the switch board in this embodiment to implement a method for managing a switch chip port using the preceding modules is the same as the implementation of the preceding related method embodiment. For details, reference may be made to the preceding related method embodiment, and therefore the details are not provided herein.

Using the preceding modules, the switch board in this embodiment is capable of controlling, when a service board is not in position, disabling of a corresponding port on the first switch chip of the main control board, and/or controlling disabling of a corresponding port on a switch chip of the switch board 2; and controlling, when a service board is in position, enabling of a corresponding port on the first switch chip of the main control board, and controlling enabling of a corresponding port on a switch chip that corresponds to the working mode of the same in-position service board on the switch board. By adopting the technical solution in this embodiment, efficient management can be performed on a corresponding port on the first switch chip of the main control board and a corresponding port on a switch chip of the switch board according to in-position information. In this manner, when a service board is used, all corresponding ports can be enabled to ensure normal communication, and when the service board is not used, the corresponding ports can be disabled to implement port energy saving.

Figure 8:
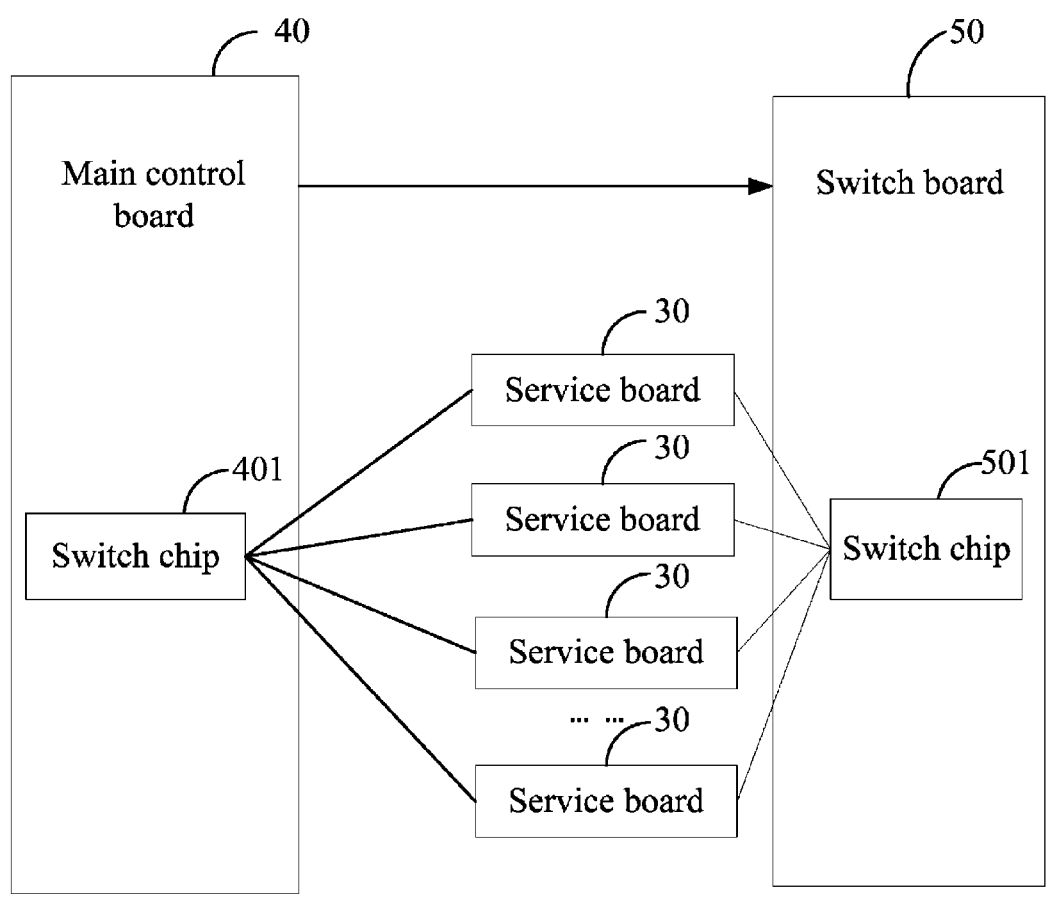
FIG. 8 is a schematic structural diagram of a distributed communications system according to an embodiment of the present invention.

FIG. 8 is a schematic structural diagram of a distributed communications system according to an embodiment of the present invention. As shown in FIG. 8, the distributed communications system in this embodiment includes multiple service boards 30, a main control board 40, and a switch board 50.

The main control board 40 and the switch board 50 communicate with each other. When being in position, the multiple service boards 30 communicate with the main control board 40 and the switch board 50, respectively. The multiple service boards 30 connect to a first switch chip 401 on the main control board 40 through ports of the first switch chip 401 on the main control board 40 respectively to implement data exchange on a management plane of the communications system; and the multiple service boards 30 further connect to a second switch chip 501 on the switch board 50 through ports of the second switch chip 501 on the switch board 50 respectively to implement data exchange on a data plane of the communications system.

Specifically, the main control board 40 in the distributed communications system in this embodiment may be the main control board 1 in the embodiment shown in FIG. 4. In this case, the switch board 50 in the distributed communications system in this embodiment may be the switch board 2 in the embodiment shown in FIG. 6. Management on a port may specifically be implemented by adopting the method for managing a port in the preceding related method embodiment. For details, reference may be made to the preceding related embodiment, and therefore the details are not provided herein.

Using the preceding main control board and the switch board, the distributed communications system in this embodiment is capable of controlling, when in-position information of a service board is not in position, disabling of a corresponding port on a switch chip of the main control board, and/or controlling disabling of a corresponding port on a switch chip of the switch board. This is capable of efficiently preventing the problem of a waste of energy caused by continuous detection of the link (Link) status of a corresponding link performed by the corresponding port on the switch chip of the main control board and the corresponding port on the switch chip of the switch board when a service board in not in position. Port energy saving can be efficiently implemented by adopting the technical solution in this embodiment of the present invention, thereby efficiently reducing power consumption of the system.

Optionally, the main control board 40 in the distributed communications system in the preceding embodiment may be the main control board 1 in the embodiment shown in FIG. 5. In this case, the switch board 50 in the distributed communications system in this embodiment may be the switch board 2 in the embodiment shown in FIG. 7. Accordingly, the switch board 2 may include multiple switch chips, and each switch chip corresponds to one working mode of a service board. Management on a port may specifically be implemented by adopting the method for managing a port in the preceding related method embodiment. For details, reference may be made to the preceding related embodiment, and therefore the details are not provided herein.

Figure 9:
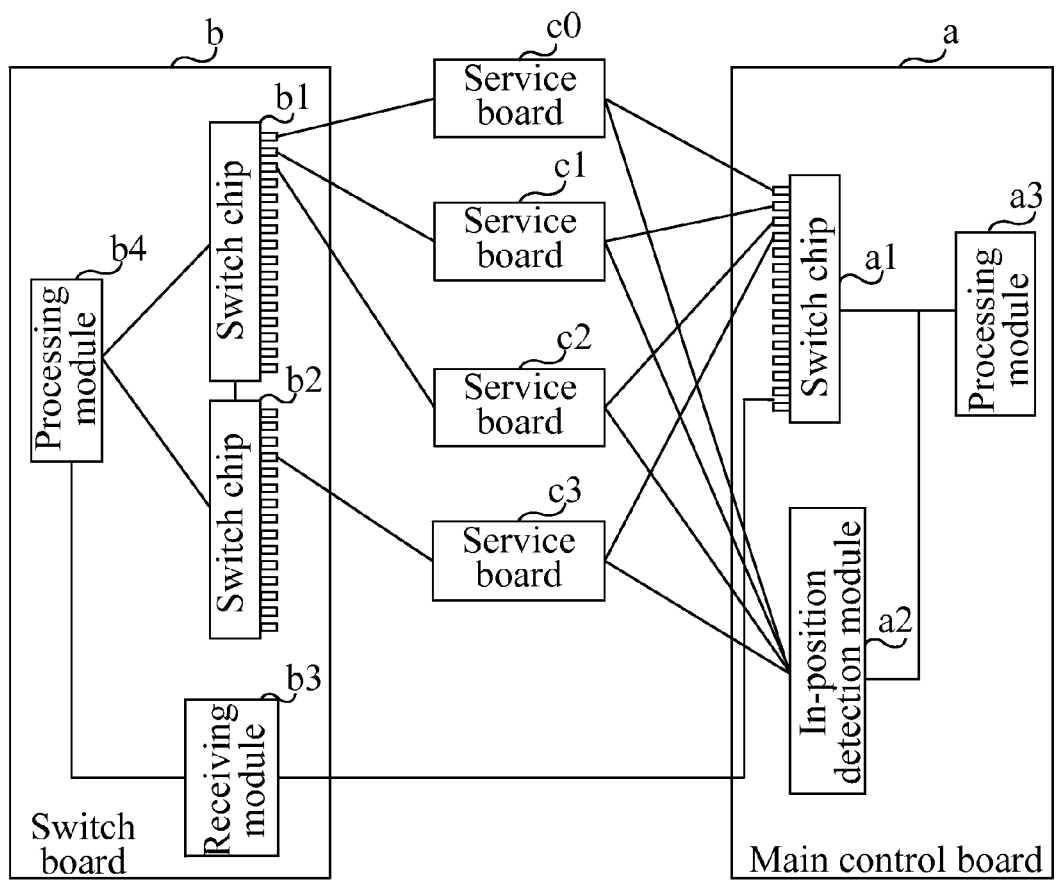
FIG. 9 is a schematic structural diagram of a distributed communications system according to an embodiment of the present invention.

FIG. 9 is an example diagram of a distributed communications system according to an embodiment of the present invention. As shown in FIG. 9, the distributed communications system including a main control board a, a switch board b, and four service boards c1, c2, c3, and c4 is taken as an example. In this embodiment, a service board c having two working modes is taken as an example. In this case, the corresponding switch board b including two switch chips b1 and b2 is taken as an example. The switch chip b1 corresponds to the working mode "0" of a service board, and the switch chip b2 corresponds to the working mode "1" of a service board.

Only one switch chip a1 exists on the main control board a. An in-position detection module a2 and a processing module a3 further exist on the main control board a. A receiving module b3 and a processing module b4 further exist on the switch board b. The service boards c1, c2, and c3 work in the working mode "0", and the service board c4 works in the working mode "1".

The in-position detection module a2 detects in-position information of the four service boards, for example, may specifically detect whether each service board is in position, and notifies the processing module a3 of the corresponding in-position conditions. Meanwhile, the processing module a3 further enables or disables a corresponding port on the switch chip a1 according to an in-position condition of each service board. For details, reference may be made to the preceding embodiment. A port on the switch chip a1 communicates with a service board to implement management on the service board. Therefore, a port on the switch chip a1 may be referred to as a switch chip port. Meanwhile, the processing module a3 may further acquire the working mode of each in-position service board by detecting each in-position service board after ports corresponding to the in-position service boards are enabled, and then send the in-position condition of each service board and the working mode of the in-position service board to the receiving module b3 on the switch board b. Specifically, the in-position condition of each service board and the working mode of the in-position service board may be sent to the receiving module b3 through a chip port on the switch chip a1. Then, the processing module b4 enables or disables a corresponding port on a corresponding switch chip according to the in-position condition of each service board and the working mode of the in-position service board. For example, the service board c1 is in position and in the working mode "0", and accordingly, a port corresponding to the service board c1 on the switch chip b1 may be enabled and a port corresponding to the service board c1 on the switch chip b2 may be disabled. Assuming that the service board c3 is in position and in the working mode "1", accordingly, a port corresponding to the service board c3 on the switch chip b2 may be enabled and a port corresponding to the service board c3 on the switch chip b1 may be disabled. Assuming that the service board c2 that is originally in the working mode "0" is not in position and the receiving module b3 receives only information that the service board c2 is not in position, ports corresponding to the service board c2 on the switch chips b1 and b2 on the switch board b need to be disabled.

Ports on the switch chips b1 and b2 communicate with service boards to implement data exchange between service boards. Therefore, the ports on the switch chips b1 and b2 may be referred to as switch chip ports.

For details about implementation of management on a switch chip port by adopting the example of the distributed communications system shown in FIG. 9, reference may be made to the implementation process of any one of the embodiments illustrated in FIG. 1 to FIG. 8. For details, refer to the preceding embodiment, and therefore the details are not provided herein.

The distributed communications system in the preceding embodiment is capable of controlling, when in-position information of a service board is the not-in-position state, disabling of a corresponding port on the switch chip of the main control board, and/or controlling disabling of a corresponding port on a switch chip of the switch board. In addition, when a service board is in position, enabling of a corresponding port on the switch chip of the main control board may be controlled and a corresponding port on a switch chip of the switch board may also be controlled. By adopting the technical solution in this embodiment, efficient management can be performed on a corresponding switch chip port on the switch chip of the main control board and a corresponding switch chip port on a switch chip of the switch board according to the in-position condition of a service board. In this manner, when the service board is used, all corresponding ports can be enabled to ensure normal communication, and when the service board is not used, the corresponding ports can be disabled to implement port energy saving.

Figure 10:
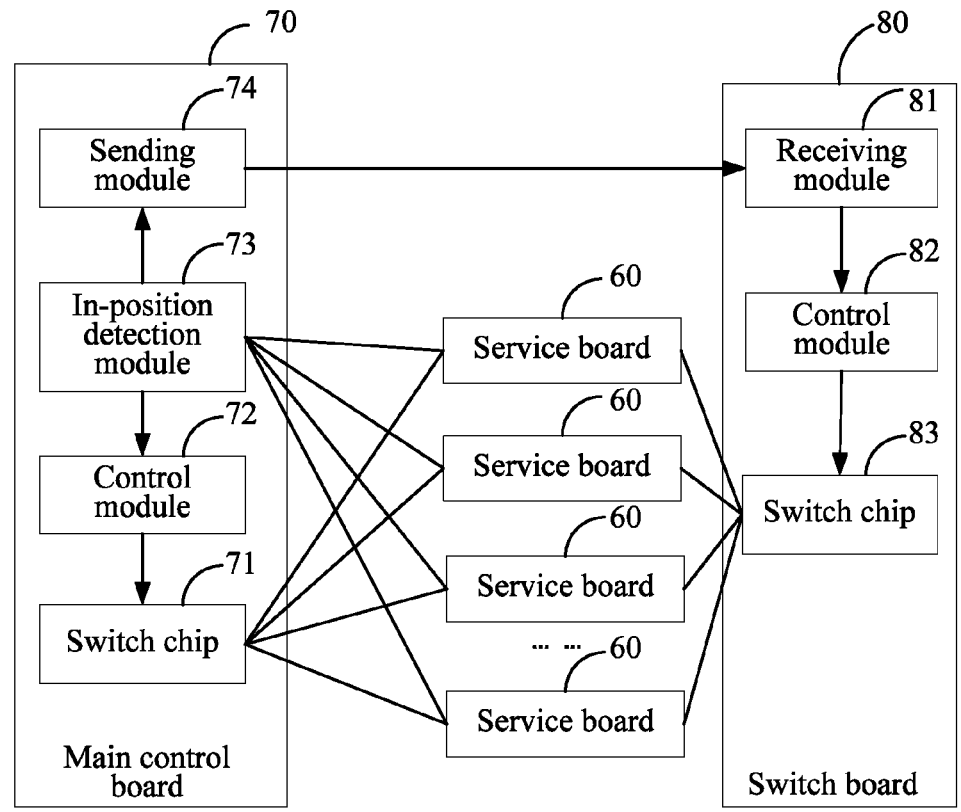
FIG. 10 is a schematic structural diagram of a distributed communications system according to an embodiment of the present invention.

FIG. 10 is an example diagram of a distributed communications system according to an embodiment of the present invention. As shown in FIG. 10, the distributed communications system in this embodiment includes multiple service boards 60, a main control board 70, and a switch board 80.

The main control board 70 includes a switch chip 71, a control module 72, an in-position detection module 73, and a sending module 74. Ports connecting to the multiple service boards 60 are disposed on the switch chip 71. The in-position detection module 73 is adapted to detect whether the multiple service boards 60 are in position. When the in-position detection module 73 detects that a certain service board 60 is in position, the in-position detection module 73 notifies the control module 72 that the service board is in position, and the control module 72 controls enabling of a port corresponding to the service board on the switch chip 71. When the in-position detection module 73 detects that a certain service board 60 is not in position, the in-position detection module 73 notifies the control module 72 that the service board is not in position, and the control module 72 controls disabling of a port corresponding to the service board on the switch chip 71, thereby implementing energy saving. Meanwhile, after detecting whether each service board is in position, the in-position detection module 73 may acquire in-position information or not-in-position information of each service board 60. The in-position information includes an in-position state identifier and the identifier of an in-position service board, and the not-in-position information includes a not-in-position state identifier and the identifier of a not-in-position service board. Then, the in-position detection module 73 notifies the sending module 74 of the in-position information or the not-in-position information of each service board 60. The sending module sends the in-position information or the not-in-position information of each service board 60 to the switch board 80. In this manner, the receiving module 81 in the switch board 80 receives the in-position information or the not-in-position information of each service board 60, and the control module 82 controls, according to the in-position information or the not-in-position information of each service board 60 received by the receiving module 81, enabling or disabling of ports corresponding to each service board on the switch chip 83. For example, when a certain service board 60 is in position, the control module 82 controls, according to the in-position information of the service board 60 received by the receiving module 81, enabling of a port corresponding to the service board on the switch chip 83. When a certain service board 60 is not in position, the control module 82 controls, according to the not-in-position information of the service board 60 received by the receiving module 81, disabling of a port corresponding to the service board on the switch chip 83.

In this embodiment, the switch board 80 including only one switch chip 83 is taken as an example for describing the technical solution of the present invention. In a practical application, when the switch board 80 includes multiple switch chips 83 corresponding to different working modes of the service boards 60, accordingly, multiple switch chips 83 are disposed in the switch board 80. The multiple switch chips 83 connect to the control module 82, respectively. The manner for implementing port management in this case is the same as the preceding related embodiment, and therefore details are not provided herein.

Using the preceding main control board and the switch board, the distributed communications system in this embodiment is capable of controlling, when in-position information of a service board is not in position, disabling of a corresponding port on a switch chip of the main control board, and/or controlling disabling of a corresponding port on a switch chip of the switch board. This is capable of efficiently preventing the problem of a waste of energy caused by continuous detection of the link (Link) status of a corresponding link performed by the corresponding port on the switch chip of the main control board and the corresponding port on the switch chip of the switch board when a service board in not in position. Port energy saving can be efficiently implemented by adopting the technical solution in this embodiment of the present invention, thereby efficiently reducing power consumption of the system.

Figure 11:
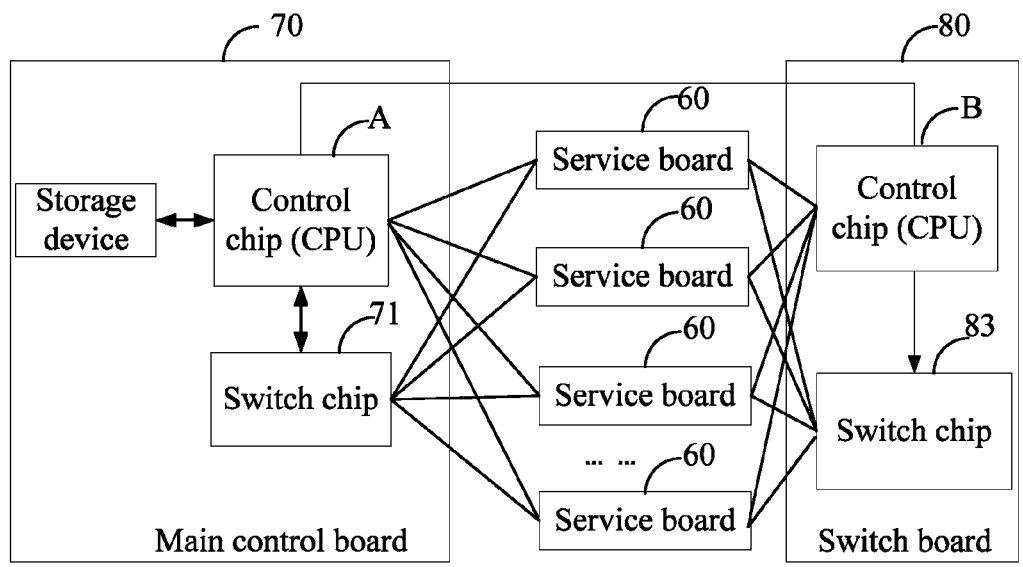
FIG. 11 is a schematic structural diagram of hardware in the distributed communications system shown in FIG. 10.

FIG. 11 is a structural diagram of hardware in the distributed communications system shown in FIG. 10. As shown in FIG. 11, a storage device, a control chip A, and a switch chip 71 are disposed in the main control board 70. The control chip A is a CPU in the main control board 70 and adapted to perform various control operations. When a program is executed, the required storage space may be configured in the storage device. The control module 72, the in-position detection module 73, and the sending module 74 in FIG. 10 may be implemented by the control chip A. Accordingly, on the side of the switch board 80, a control chip B (an integrable memory unit) and a switch chip 83 may be disposed in the switch board 80. Accordingly, the receiving module 81 and the control module 82 in FIG. 10 may be implemented by the control chip B. The mechanism for the distributed communications system shown in FIG. 11 to implement management on a switch chip port is the same as the embodiment shown in FIG. 10. For details, reference may be made to the preceding embodiment, and therefore the details are not provided herein.

For ease of description, in the embodiments of the present invention, the main control board or the switch board is not described by using a separate diagram, and instead, a schematic diagram of a distributed communications system including the two apparatuses, that is, the main control board and the switch board, is taken as an example to describe the technical solutions of the present invention. Those skilled in the art may know, according to the technical solutions of the preceding embodiments, the main control board and the switch board that are protected in this application.

The apparatus embodiment described above is merely illustrative. The units described as stand-alone components above may be separated physically or not; and the components shown as units may be physical units or not, that is, they may be located in one place, or distributed on at least two network elements. A part of or all of the modules may be selected to achieve the objective of the solution of this embodiment according to actual demands. Persons of ordinary skill in the art may understand and implement the embodiments without creative efforts.

Finally, it should be noted that the foregoing embodiments of the present invention are intended for describing the technical solutions of the present invention other than limiting the present invention. Although the present invention is described in detail with reference to the foregoing embodiments, persons of ordinary skill in the art should understand that they can still make modifications to the technical solutions described in the foregoing embodiments, or make equivalent substitutions to some technical features thereof, without departing from the spirit and scope of the technical solutions of the embodiments of the present invention.

What is claimed is:

1. A method for managing a switch chip port in a communications system, wherein the communications system comprises a switch board, a main control board, and a plurality of service boards, the main control board comprising a first switch chip, the first switch chip comprising a plurality of switch chip ports, each of the switch chip ports of the first switch chip being capable of connecting to one of the service boards to facilitate data exchange of the communications system, the switch board comprising a second switch chip, the second switch chip comprising a plurality of switch chip ports, each of the switch chip ports of the second switch chip being capable of connecting to one of the service boards to facilitate the data exchange of the communications system, each of the service boards being capable of directly connecting to the main control board via one of the switch chip ports of the first switch chip and directly connecting to the switch board via one of the switch chip ports of the second switch chip, the switch board further comprising a third switch chip, the third switch chip comprising a plurality of switch chip ports, each of the switch chip ports of the third switch chip being capable of connecting to one of the service boards, the second switch chip and the third switch chip being adapted to support the service boards working in different working modes, the method comprising:

detecting, by the main control board, a service board of the service boards being in position;

enabling, by the main control board, a first switch chip port of the first switch chip, wherein the first switch chip port is configured by the main control board for connecting to the detected service board;

acquiring, by the main control board, a first working mode of the detected service board;

sending, by the main control board, a in-position message to the switch board, wherein the in-position message comprises a working mode of the detected service board and indicating the detected service board being in position;

receiving, by the switch board, the in-position message;

enabling, by the switch board, a second switch chip port of the second switch chip in response to the in-position message, wherein the second switch chip port is configured by the switch board for connecting to the detected service board in accordance with the working mode of the detected service board; and disabling, by the switch board, a third switch chip port of the third switch chip in response to the in-position message, wherein the third switch chip port is configured by the switch board for connecting to the detected service board in accordance with another working mode of the detected service board.

2. The method according to claim 1, wherein the in-position message comprises an identifier of the detected service board.

3. A method for managing a switch chip port in a communications system, wherein the communications system comprises a switch board, a main control board, and a plurality of service boards, the main control board comprising a first switch chip, the first switch chip comprising a plurality of switch chip ports, each of the switch chip ports of the first switch chip being capable of connecting to one of the service boards to facilitate data exchange of the communications system, the switch board comprising a second switch chip, the second switch chip comprising a plurality of switch chip ports, each of the switch chip ports of the second switch chip being capable of connecting to one of the service boards to facilitate the data exchange of the communications system, and each of the service boards being capable of directly connecting to the main control board via one of the switch chip ports of the first switch chip and directly connecting to the switch board via one of the switch chip ports of the second switch chip, wherein the switch board further comprises a third switch chip, the third switch chip comprising a plurality of switch chip ports, each of the switch chip ports of the third switch chip being capable of connecting to one of the service boards, the second switch chip and the third switch chip being adapted to support the service boards working in different working modes, the method comprising:

detecting, by the main control board, a first service board of the service boards being not in position;

disabling, by the main control board, a first switch chip port of the first switch chip in response to the detecting, the first switch chip port being configured by the main control board for connecting to the first service board;

sending, by the main control board, a first in-position message to the switch board, the first in-position message indicating the first service board being not in position;

receiving, by the switch board, the first in-position message;

disabling, by the switch board, a second switch chip port of the second switch chip in response to the first in-position message, the second switch chip port being configured by the switch board for connecting to the first service board;

detecting, by the main control board, a second service board of the service boards being in position;

enabling, by the main control board, a third switch chip port of the first switch chip, the third switch chip port being configured by the main control board for connecting to the second service board;

acquiring, by the main control board, a working mode of the second service board;

sending, by the main control board, a second in-position message to the switch board, the second in-position message comprising the first working mode of the second service board and indicating the second service board being in position;

receiving, by the switch board, the second in-position message;

enabling, by the switch board, a fourth switch chip port of the second switch chip in response to the second in-position message, the fourth switch chip port being configured by the switch board for connecting to the second service board in accordance with the working mode of the second service board; and disabling, by the switch board, a fifth switch chip port of the third switch chip in response to the second in-position message, the fifth switch chip port being configured by the switch board for connecting to the second service board in accordance with another working mode of the second service board.

4. The method according to claim 1, wherein the first switch chip port of the first switch chip is disabled via a control register.

5. A method for managing a switch chip port in a communications system, wherein the communications system comprises a switch board, a main control board, and a plurality of service boards, the main control board comprising a first switch chip, the first switch chip comprising a plurality of switch chip ports, each of the switch chip ports of the first switch chip being capable of connecting to one of the service boards to facilitate data exchange of the communications system, the switch board comprising a second switch chip, the second switch chip comprising a plurality of switch chip ports, each of the switch chip ports of the second switch chip being capable of connecting to one of the service boards to facilitate the data exchange of the communications system, each of the service boards being capable of directly connecting to the main control board via one of the switch chip ports of the first switch chip and directly connecting to the switch board via one of the switch chip ports of the second switch chip, wherein the switch board further comprises a third switch chip, the third switch chip comprising a plurality of switch chip ports, each of the switch chip ports of the third switch chip being capable of connecting to one of the service boards, the second switch chip and the third switch chip being adapted to support the service boards working in different working modes;

the method comprising:

receiving, by the switch board, a in-position message sent by the main control board, the in-position message comprising a working mode of a first service board of the service boards and indicating the first service board being in position, wherein the in-position message being obtained by performing in-position detection on each of the switch chip ports of the first switch chip by the main control board;

enabling, by the switch board, a first switch chip port of the second switch chip in response to the in-position message, wherein the first switch chip port is configured by the switch board for connecting to the first service board in accordance with the working mode of the first service board; and disabling, by the switch board, a second switch chip port of the third switch chip in response to the in-position message, wherein the second switch chip port is configured by the switch board for connecting to the first service board in accordance with another working mode of the first service board.

6. The method according to claim 5, wherein the first switch chip port of the second switch chip is enabled via a control register.

7. A method for managing a switch chip port in a communications system, wherein the communications system comprises a switch board, a main control board, and a plurality of service boards, the main control board comprising a first switch chip, the first switch chip comprising a plurality of switch chip ports, each of the switch chip ports of the first switch chip being capable of connecting to one of the service boards to facilitate data exchange of the communications system, the switch board comprising a second switch chip, the second switch chip comprising a plurality of switch chip ports, each of the switch chip ports of the second switch chip being capable of connecting to one of the service boards to facilitate the data exchange of the communications system, each of the service boards being capable of directly connecting to the main control board via one of the switch chip ports of the first switch chip and directly connecting to the switch board via one of the switch chip ports of the second switch chip;

wherein the switch board further comprises a third switch chip, the third switch chip comprising a plurality of switch chip ports, each of the switch chip ports of the third switch chip being capable of connecting to one of the service boards, the second switch chip and the third switch chip being adapted to support the service boards working in different working modes;

the method comprising:

receiving, by the switch board, a first in-position message sent by the main control board, wherein the first in-position message indicates a first service board of the service boards being not in position, the first in-position message being obtained by performing in-position detection on each of the switch chip ports of the first switch chip by the main control board;

disabling, by the switch board, a first switch chip port of the second switch chip in response to the first in-position message, wherein the first switch chip port is configured by the switch board for connecting to the first service board;

receiving, by the switch board, a second in-position message sent by the main control board, wherein the second in-position message comprises a working mode of a second service board of the service boards and indicating the second service board being in position, and the second in-position message is obtained by performing in-position detection on each of the switch chip ports of the first switch chip by the main control board;

enabling, by the switch board, a second switch chip port of the second switch chip in response to the second in-position message, wherein the second switch chip port is configured by the switch board for connecting to the second service board in accordance with the working mode of the second service board; and disabling, by the switch board, a third switch chip port of the third switch chip in response to the second in-position message, wherein the third switch chip port is configured by the switch board for connecting to the second service board in accordance with another working mode of the second service board.

8. The method according to claim 7, further comprising:

determining, according to the working mode of the second service board, the second switch chip corresponds to the working mode of the second service board and the third switch chip corresponds to another working mode of the second service board.

9. The method according to claim 7, wherein the first switch chip port of the second switch chip is disabled via a control register.

10. A main control board used in a communications system, the communications system comprising the main control board, a switch board and a plurality of service boards, the main control board comprising: a first switch chip, an in-position detection module, a processing module, a sending module and an acquisition module coupled with the in-position detection module, wherein the first switch chip of the main control board comprises a plurality of switch chip ports, each of the switch chip ports of the first switch chip being capable of connecting to one of the service boards to facilitate data exchange of the communications system;

the switch board comprises a second switch chip, the second switch chip comprising a plurality of switch chip ports, each of the switch chip ports of the second switch chip being configured for connecting to one of the service boards to facilitate the data exchange of the communications system;

each of the service boards is capable of directly connecting to the main control board via one of the switch chip ports of the first switch chip and directly connecting to the switch board via one of the switch chip ports of the second switch chip;

the switch board further comprises a third switch chip, the third switch chip comprising a plurality of switch chip ports, each of the plurality of switch chip ports of the third switch chip being capable of connecting to one of the service boards;

the second switch chip and the third switch chip are configured to support the service boards working in different working modes;

the in-position detection module of the main control board is adapted to detect a service board of the service boards being in position;

the acquisition module of the main control board is configured to acquire a working mode of the detected service board;

the processing module of the main control board is configured to enable a first switch chip port of the first switch chip, the first switch chip port being configured for connecting to the detected service board; and the sending module of the main control board is configured to send a in-position message to the switch board, the in-position message comprising the working mode of the detected service board and indicating the detected service board is in position, the in-position message enabling the switch board to enable a second switch chip port of the second switch chip and to disable a third switch chip port of the third switch chip, the second switch chip port being configured for connecting to the detected service board in accordance with the working mode of the detected service board, the third switch chip port being configured for connecting to the detected service board in accordance with another working mode of the detected service board.

11. The main control board according to claim 10, wherein the in-position message comprises an identifier of the detected service board.

12. A main control board used in a communications system, the communications system comprising the main control board, a switch board and a plurality of service boards, the main control board comprising: a first switch chip, an in-position detection module, a processing module and a sending module, wherein the first switch chip of the main control board comprises a plurality of switch chip ports, each of the switch chip ports of the first switch chip being capable of connecting to one of the service boards to facilitate data exchange of the communications system;

the switch board comprises a second switch chip, the second switch chip comprising a plurality of switch chip ports, each of the switch chip ports of the second switch chip being capable of connecting to one of the service boards to facilitate the data of the communications system;

each of the service boards is capable of directly connecting to the main control board via one of the switch chip ports of the first switch chip and directly connecting to the switch board via one of the switch chip ports of the second switch chip;

the switch board further comprises a third switch chip, the third switch chip comprising a plurality of switch chip ports, each of the plurality of switch chip ports of the third switch chip being capable of connecting to one of the service boards;

the second switch chip and the third switch chip are configured to support the service boards working in different working modes;

the main control board further comprises an acquisition module coupled with the in-position detection module;

the in-position detection module of the main control board is configured to detect a first service board of the service boards being not in position;

the processing module of the main control board, coupled with the in-position detection module and the first switch chip, is adapted to disable a first switch chip port of the first switch chip, the first switch chip port being configured for connecting to the first service board;

the sending module of the main control board is adapted to send a first in-position message to the switch board, the first in-position message indicating the first service board being not in position, the first in-position message enabling the switch board to disable a second switch chip port of the second switch chip, the second switch chip port being configured for connecting to the first service board;

the in-position detection module of the main control board is further configured to detect a second service board of the service boards being in position;

the acquisition module of the main control board is configured to acquire a working mode of the second service board;

the processing module of the main control board is further configured to enable a third switch chip port of the first switch chip, the third switch chip port being configured for connecting to the second service board;

the sending module of the main control board further configured to send a second in-position message to the switch board, the second in-position message comprising the working mode of the second service board and indicating the second service board being in position, the second in-position message enabling the switch board to enable a fourth switch chip port of the second switch chip and disable a fifth switch chip port of the third switch chip, the fourth switch chip port being configured for connecting to the second service board in accordance with the working mode of the second service board, the fifth switch chip port being configured for connecting to the second service board in accordance with another working mode of the second service board.

13. The main control board according to claim 12, wherein the first switch chip port of the first switch chip is disabled via a control register of the main control board.

14. A switch board used in a communications system, the communications system comprising the switch board, a main control board and a plurality of service boards, the main control board comprising a first switch chip, the first switch chip comprising a plurality of switch chip ports, each of the switch chip ports of the first switch chip being capable of connecting to one of the service boards to facilitate data exchange of the communications system, the switch board comprises: a second switch chip, a receiving module, a processing module, and a third switch chip, wherein the second switch chip comprises a plurality of switch chip ports, each of the switch chip ports of the second switch chip being capable of connecting to one of the service boards to facilitate the data exchange of the communications system;

each of the service boards is capable of directly connecting to the main control board via one of the switch chip ports of the first switch chip and directly connecting to the switch board via one of the switch chip ports of the second switch chip;

the third switch chip comprising a plurality of switch chip ports, each of the switch chip ports of the third switch chip being capable of connecting to one of the service boards;

the second switch chip and the third switch chip are configured to support the service boards working in different working modes;

the receiving module is configured to receive a in-position message sent by the main control board, the in-position message comprising a working mode of a detected service board of the service boards and indicating the detected service board being in position, the in-position message being obtained by performing in-position detection on each of the switch chip ports of the first switch chip by the main control board; and the processing module is configured to enable a first switch chip port of the second switch chip and disable a second switch chip port of the third switch chip in response to the in-position message, the first switch chip port being configured by the switch board for connecting to the detected service board in accordance with the working mode of the detected service board, the second switch chip port being configured by the switch board for connecting to the detected service board in accordance with another working mode of the detected service board.

15. The switch board according to claim 14, wherein the first switch chip port of the second switch chip is enabled via a control register of the switch board.

16. The switch board according to claim 14, wherein the in-position message comprises an identifier of the detected service board.

17. A switch board used in a communications system, the communications system comprising the switch board, a main control board and a plurality of service boards, the main control board comprising a first switch chip, the first switch chip comprising a plurality of switch chip ports, each of the switch chip ports of the first switch chip being capable of connecting to one of the service boards to facilitate data exchange of the communications system, the switch board comprises: a second switch chip, a receiving module, and a processing module, wherein the second switch chip comprises a plurality of switch chip ports, each of the switch chip ports of the second switch chip being capable of connecting to one of the service boards to facilitate the data exchange of the communications system;

each of the service boards is capable of directly connecting to the main control board via one of the switch chip ports of the first switch chip and directly connecting to the switch board via one of the switch chip ports of the second switch chip;

the receiving module is configured to receive a first in-position message sent by the main control board, the first in-position message indicating a first service board of the service boards being not in position, the first in-position message being obtained by performing in-position detection on each of the switch chip ports of the first switch chip by the main control board; and the processing module is configured to disable a first switch chip port of the second switch chip in response to the first in-position message, wherein the first switch chip port is configured by the switch board for connecting to the first service board;

the switch board further comprise a third switch chip, the third switch chip comprising a plurality of switch chip ports, each of the switch chip ports of the third switch chip being capable of connecting to one of the service boards;

the second switch chip and the third switch chip are configured to support the service boards working in different working modes;

the receiving module is further configured to receive a second in-position message sent by the main control board, the second in-position message comprising a working mode of a second service board of the service boards and indicating the second service board is in position, the second in-position message being obtained by performing in-position detection on each of the switch chip ports of the first switch chip by the main control board; and the processing module is further configured to enable a second switch chip port of the second switch chip and disable a third switch chip port of the third switch chip in response to the second in-position message, the second switch chip port being configured by the switch board for connecting to the second service board in accordance with the working mode of the second service board, the third switch chip port being configured by the switch board for connecting to the second service board in accordance with another working mode of the second service board.

18. The switch board according to claim 17, wherein the processing module comprises:

an acquisition unit, configured to determine the second switch chip corresponding to the working mode of the second service board and the third switch chip corresponding to another working mode of the second service board.

19. The switch board according to claim 17, wherein the first switch chip port of the second switch chip is disabled via a control register of the switch board.

20. The switch board according to claim 18, wherein the processing module further comprises:

a processing unit, configured to enable the second switch chip port of the second switch chip and disable the third switch chip port of the third switch chip.

\* \* \* \* \*

UNITED STATES PATENT AND TRADEMARK OFFICE
CERTIFICATE OF CORRECTION

| | | |
|---|---|---|
| PATENT NO. | : 8,787,365 B2 | Page 1 of 1 |
| APPLICATION NO. | : 13/675179 | |
| DATED | : July 22, 2014 | |
| INVENTOR(S) | : Fang | |

It is certified that error appears in the above-identified patent and that said Letters Patent is hereby corrected as shown below:

On the Title Page, Item [71], "Guangdong (CN)" should read -- Shenzhen (CN) --.

In the Claims

Column 24, line 51, Claim 3, "first" should be deleted.

Signed and Sealed this
Twenty-fifth Day of November, 2014

Michelle K. Lee
*Deputy Director of the United States Patent and Trademark Office*